(12) United States Patent
Kambayashi et al.

(10) Patent No.: US 9,053,062 B2
(45) Date of Patent: *Jun. 9, 2015

(54) MEMORY CHIP FOR CONVERTING DATA RECEIVED FROM CONTROLLER CONTROLLING READING AND WRITING OF DATA

(71) Applicant: Kabushiki Kaisha Toshiba, Minato-ku (JP)

(72) Inventors: Toru Kambayashi, Kanagawa (JP); Akihiro Kasahara, Chiba (JP); Shinichi Matsukawa, Tokyo (JP); Hiroyuki Sakamoto, Tokyo (JP); Taku Kato, Kanagawa (JP); Hiroshi Sukegawa, Tokyo (JP); Yoshihiko Hirose, Kanagawa (JP); Atsushi Shimbo, Tokyo (JP); Koichi Fujisaki, Kanagawa (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 0 days.

This patent is subject to a terminal disclaimer.

(21) Appl. No.: 14/303,704

(22) Filed: Jun. 13, 2014

(65) Prior Publication Data

US 2014/0298043 A1 Oct. 2, 2014

Related U.S. Application Data

(63) Continuation of application No. 13/924,675, filed on Jun. 24, 2013, now Pat. No. 8,788,907, which is a continuation of application No. 12/882,979, filed on Sep. 15, 2010, now Pat. No. 8,473,810, which is a continuation of application No. PCT/JP2009/070056, filed on Nov. 27, 2009.

(51) Int. Cl.
*G11C 29/00* (2006.01)
*G06F 12/14* (2006.01)
(Continued)

(52) U.S. Cl.
CPC ............ *G06F 12/1466* (2013.01); *G06F 21/79* (2013.01); *H04L 2209/34* (2013.01);
(Continued)

(58) Field of Classification Search
CPC ....................................................... G06F 21/30
USPC ............................................ 714/763; 726/27
See application file for complete search history.

(56) References Cited

U.S. PATENT DOCUMENTS

| | | | |
|---|---|---|---|
| 4,694,412 A | 9/1987 | Domenik et al. | |
| 4,757,468 A | 7/1988 | Domenik et al. | |

(Continued)

FOREIGN PATENT DOCUMENTS

| | | |
|---|---|---|
| JP | 1-162957 | 6/1989 |
| JP | 2006-350782 | 12/2006 |

(Continued)

OTHER PUBLICATIONS

CPRM Specification, SD Memory Card Book, Common Part, Intel Corporation, IBM Corporation, Matsushita Electric Industrial Co., Ltd., Toshiba Corporation, Revision 0.961. 4C Entity, May 3, 2007, pp. i-x and 1-26.

(Continued)

*Primary Examiner* — Esaw Abraham
(74) *Attorney, Agent, or Firm* — Oblon, McClelland, Maier & Neustadt, L.L.P.

(57) ABSTRACT

According to one embodiment, a memory chip, which is connected to a controller that controls reading and writing of data in response to a request from an external device, includes: a memory including a special area that is a predetermined data storage area; a key storage unit that stores therein a second key that corresponds to a first key used by the external device to convert the data; a converting unit that receives, from the controller, data to be written into the special area and generates converted data by converting the data to be written using the second key; and a writing unit that writes the converted data into the special area.

16 Claims, 29 Drawing Sheets

(51) Int. Cl.
  *G06F 21/79* (2013.01)
  *H04L 9/08* (2006.01)
  *G06F 21/30* (2013.01)

(52) U.S. Cl.
  CPC ............ *H04L9/0838* (2013.01); *H04L 9/0897* (2013.01); *G06F 21/30* (2013.01); *G06F 2221/2107* (2013.01); *H04L 9/08* (2013.01); *H04L 2463/062* (2013.01); *G06F 2212/1052* (2013.01)

(56) References Cited

U.S. PATENT DOCUMENTS

| | | | |
|---|---|---|---|
| 5,428,685 | A | 6/1995 | Kadooka et al. |
| 6,111,951 | A | 8/2000 | Guenther |
| 6,529,883 | B1 | 3/2003 | Yee et al. |
| 7,062,652 | B2 | 6/2006 | Hirota et al. |
| 7,124,436 | B2 | 10/2006 | Okaue et al. |
| 7,126,891 | B1 | 10/2006 | Kobayashi et al. |
| 7,171,528 | B2 | 1/2007 | Evans et al. |
| 7,577,850 | B2 | 8/2009 | Barr |
| 7,596,812 | B2 | 9/2009 | Li et al. |
| 7,738,662 | B2 * | 6/2010 | Asano et al. ................ 380/277 |
| 7,757,101 | B2 | 7/2010 | Nonaka et al. |
| 7,996,914 | B2 | 8/2011 | Hirota et al. |
| 8,127,368 | B2 | 2/2012 | Hirota et al. |
| 8,196,017 | B1 | 6/2012 | Gupta |
| 8,200,961 | B2 * | 6/2012 | Srinivasan et al. ........... 713/161 |
| 8,301,912 | B2 * | 10/2012 | Lin et al. ...................... 713/193 |
| 8,347,047 | B2 | 1/2013 | Perego et al. |
| 8,351,914 | B2 * | 1/2013 | Findikli et al. ................ 455/418 |
| 8,607,069 | B2 * | 12/2013 | Kihara et al. ................. 713/193 |
| 2006/0239449 | A1 | 10/2006 | Holtzman et al. |
| 2006/0239450 | A1 | 10/2006 | Holtzman et al. |
| 2006/0242429 | A1 | 10/2006 | Holtzman et al. |
| 2006/0288235 | A1 | 12/2006 | Goto |
| 2007/0180539 | A1 | 8/2007 | Holtzman et al. |
| 2007/0192664 | A1 | 8/2007 | Ogawa et al. |
| 2008/0295180 | A1 | 11/2008 | Yoneda |

FOREIGN PATENT DOCUMENTS

| | | |
|---|---|---|
| JP | 2007-220211 | 8/2007 |
| JP | 2008-524754 | 7/2008 |
| JP | 2008-524969 | 7/2008 |
| JP | 2008-541591 | 11/2008 |
| WO | WO 2005/050432 A1 | 6/2005 |

OTHER PUBLICATIONS

AACS Introduction and Common Cryptographic Elements Book, Intel Corporation, IBM Corporation, Microsoft Corporation, Panasonic Corporation, Sony Corporation, Toshiba Corporation, The Walt Disney Company, Warner Bros., Revision 0.951.AACS, Sep. 28, 2009, pp. i-xiii and 1-89.

Office Action mailed Oct. 2, 2012 in Japanese Application No. 2010-527680 (w/English translation).

* cited by examiner

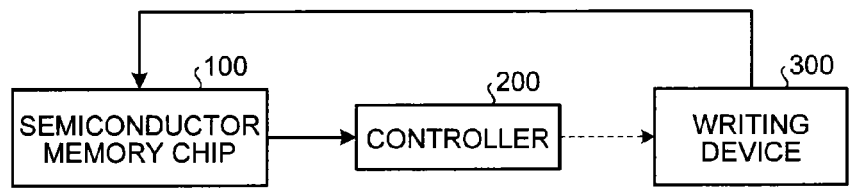
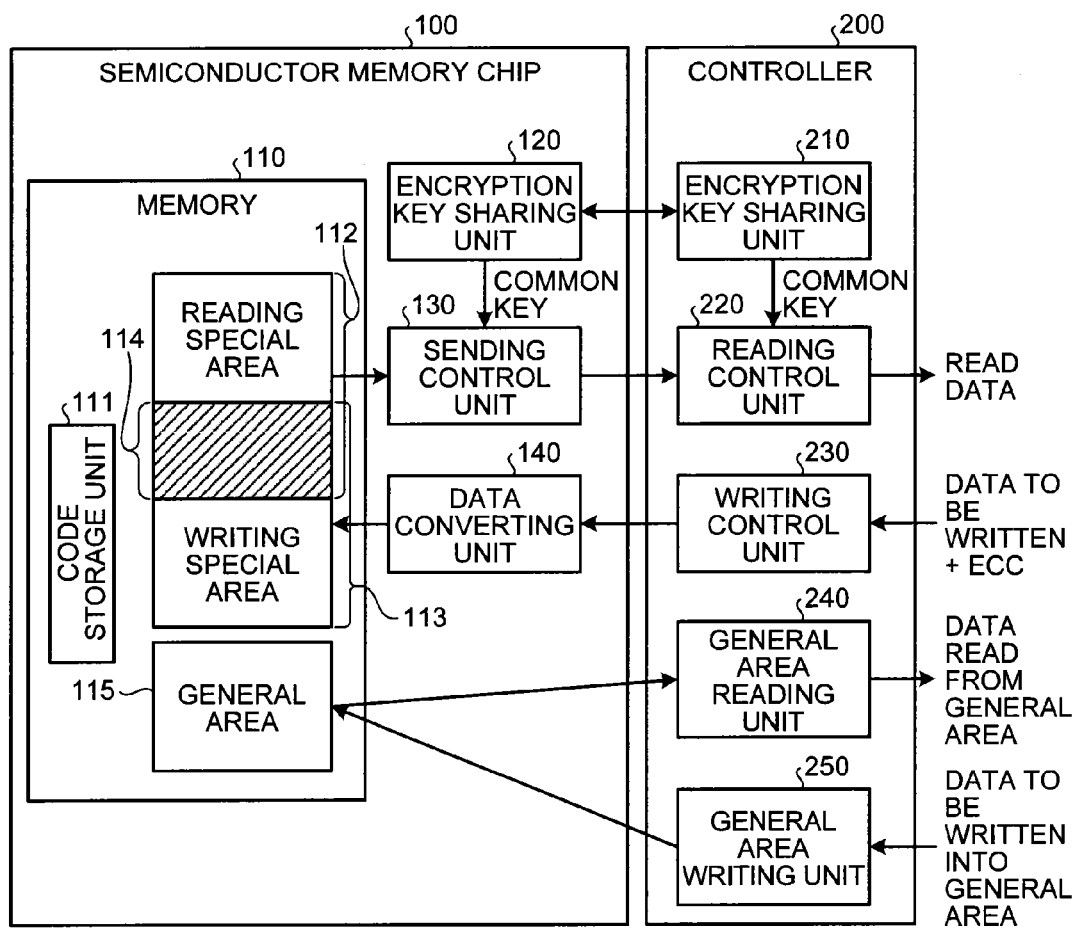

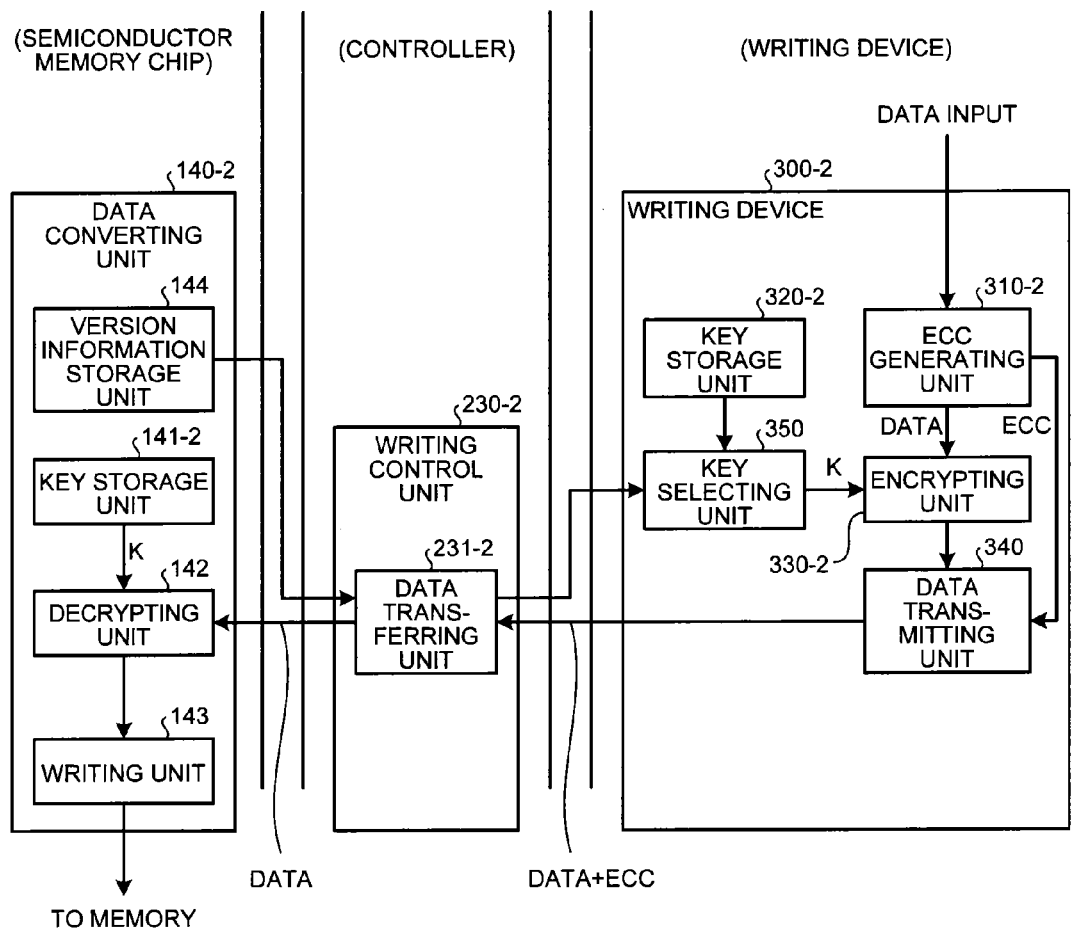

FIG.20

| VERSION INFORMATION | | | ENCRYPTION KEY |
|---|---|---|---|
| MANUFACTURING FACTORY | LOT NUMBER | CLIENT NUMBER | |
| Fukushima2 | 2030221037 | 0 | 0xFA0E10F5378E0B7712... |
| Fukushima2 | 2030221038 | 2021 | 0xBA492839AECC9763C... |
| ... | | | ... |
| Shanghai3 | 501120923012 | 335 | 0x2176E3F2CBAE2394C... |
| ... | | | ... |

MEMORY CHIP FOR CONVERTING DATA RECEIVED FROM CONTROLLER CONTROLLING READING AND WRITING OF DATA

CROSS-REFERENCE TO RELATED APPLICATIONS

This application is a continuation of and claims the benefit of priority under 35 U.S.C. §120 from Ser. No. 13/924,675 filed Jun. 24, 2013 (now U.S. Pat. No. 8,788,907 issued Jul. 22, 2014), which is a continuation of U.S. Ser. No. 12/882,979 filed Sep. 15, 2010 (now U.S. Pat. No. 8,473,810 issued Jun. 25, 2013), which is a continuation of PCT International Application Serial No. PCT/JP2009/070056 filed Nov. 27, 2009, the entire contents of each of which are incorporated herein by reference.

FIELD

Embodiments described herein relate generally to a memory chip.

BACKGROUND

A semiconductor memory chip provided on a semiconductor die is not usually used by itself, but is used while being electrically connected to a controller provided on the outside thereof. An external device (e.g., a writing device, a reading device, or a playback device) accesses data stored in a memory included in the semiconductor memory chip via a controller. In some situations, a controller and a semiconductor memory chip are combined together and sold as a memory product. For instance, examples of such memory products include merchandise such as Secure Digital (SD) memory cards. In some other situations, a product obtained by adhering a semiconductor memory chip to a controller with the use of a resin is provided as a System In Package (SIP). Further, in the case where a semiconductor memory chip is employed in an audio player or the like for the purpose of storing music data therein, the controller may be incorporated in a part of another semiconductor that is different from the semiconductor memory chip. In any of these situations, the semiconductor memory chip is directly connected to the controller, so that the access to the data stored in the memory included in the semiconductor memory chip is always made via the controller.

The controller not only intermediates the access to the data stored in the semiconductor memory chip, but also provides a security function in some situations. For example, for SD memory cards, a copyright protecting function has been introduced to the controller. The controller is configured so as to authenticate a host device such as a player or a writing device, so that, only if the host device has successfully been authenticated, the controller allows the data stored in the semiconductor memory chip to be transferred to the host device. Further, only if a writing device has successfully been authenticated, the controller records the data received from the writing device into the semiconductor memory chip. With these arrangements, an illegitimate player that has not been authenticated, for example, is not able to access the data stored in the memory card. Accordingly, it is possible to protect the data stored in the memory card from being stolen by the illegitimate player.

Even in the situation where the copyright protecting function is realized by the controller for the memory card, other types of attacks may occur. For example, let us assume that video data is stored in a memory card. The video data stored in the memory card is protected from being read by an illegitimate player because of the copyright protecting function of the controller for the memory card. Thus, the video data is protected from illegitimate copying that uses an illegitimate player.

However, it is possible for an adversary to open the package of a memory card and to read all the video data from the semiconductor memory chip. Further, by copying the video data onto another semiconductor memory chip and combining the semiconductor memory chip with a controller that has been purchased separately, the adversary will be able to produce copies of a counterfeit memory as many as he likes, in which the video data is stored. Furthermore, a legitimate player is able to play back the video data stored in each of the counterfeit memory cards, just like video data stored in a legitimate memory card.

BRIEF DESCRIPTION OF THE DRAWINGS

FIG. 1 is a diagram of an example of a trust chain;

FIG. 2 is a block diagram of a semiconductor memory chip and a controller according to a first embodiment;

FIG. 17 is a diagram of modification examples of the writing control unit and the data converting unit;

FIG. 18 is a drawing of an example of a data structure of a key storage unit;

FIG. 20 is a drawing of a modification example of version information;

DETAILED DESCRIPTION

Figure 3:
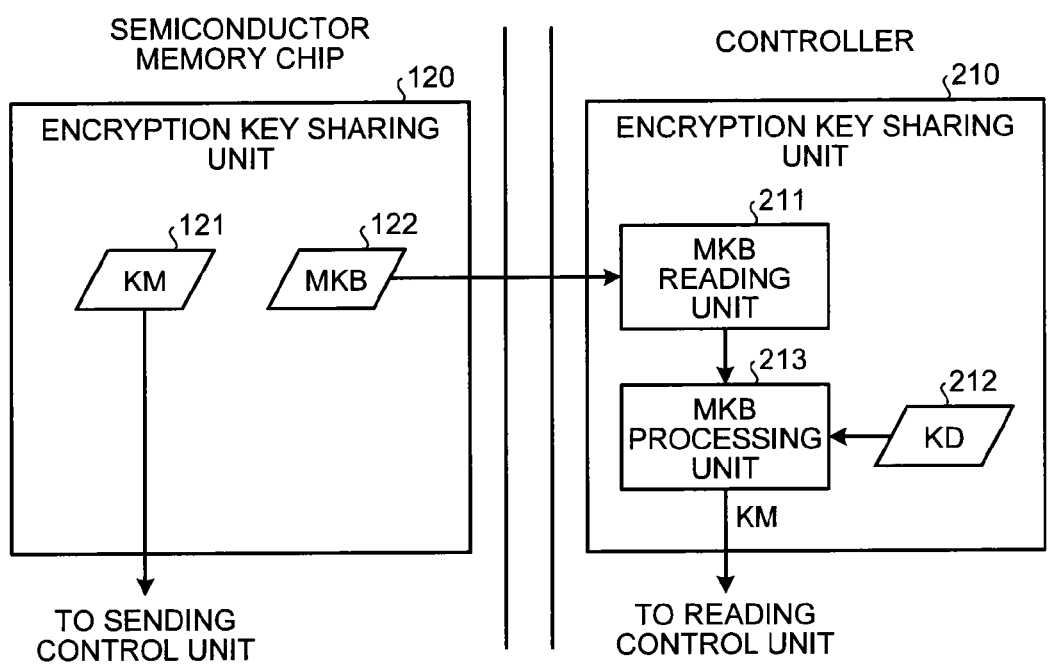
FIG. 3 is a diagram of exemplary configurations of encryption key sharing units.

In general, according to one embodiment, a memory chip, which is connected to a controller that controls reading and writing of data in response to a request from an external device, includes: a memory including a special area that is a predetermined data storage area; a key storage unit that stores therein a second key that corresponds to a first key used by the external device to convert the data; a converting unit that receives, from the controller, data to be written into the special area and generates converted data by converting the data to be written using the second key; and a writing unit that writes the converted data into the special area.

Exemplary embodiments of a memory chip will be explained in detail with reference to the accompanying drawings.

A memory chip (i.e., a semiconductor memory chip) according to a first embodiment is configured such that the semiconductor memory chip has a security function. The semiconductor memory chip itself is incorporated in a trust chain. With this arrangement, it is possible to prevent the semiconductor memory chip from being used in combination with an illegitimate controller. Semiconductor memory chips are advanced component parts, and it is not easy to manufacture or sell semiconductor memory chips, unlike controllers having illegitimate IDs.

Next, a trust chain will be explained with reference to FIG. 1. FIG. 1 is a diagram of an example of a system in which a semiconductor memory chip 100 is incorporated in a trust chain. The arrow shown in FIG. 1 indicates the direction of an authentication process. In other words, the semiconductor memory chip 100 authenticates a controller 200, the controller 200 authenticates a writing device 300, and the writing device 300 authenticates the semiconductor memory chip 100. The authentication process shown with the broken line is optional. The writing device 300 is a starting point of the trust chain. The trust chain shown in FIG. 1 is constructed in order to authenticate the controller 200 via the semiconductor memory chip 100. The data flow between the writing device 300 and the semiconductor memory chip 100 is always realized via the controller 200. Thus, the semiconductor memory chip 100 is authenticated by the writing device 300 indirectly.

According to the first embodiment, to incorporate the semiconductor memory chip 100 into the trust chain, the semiconductor memory chip 100 itself is provided with a security function. More specifically, a special area is structured in a memory included in the semiconductor memory chip 100. The special area includes a reading special area and a writing special area. The reading special area is a predetermined memory area within a storage area (i.e., a memory area) of the memory from which only the controller 200 that has been authenticated by the semiconductor memory chip 100 is able to read the stored value correctly. The writing special area is a predetermined memory area within the memory area into which, during a data writing process, data that has been decrypted by a data converting unit (explained later) is to be written.

Further, according to the first embodiment, to incorporate the semiconductor memory chip 100 into the trust chain, the reading special area and the writing special area are provided with a common area. Information that is essential to the utilization of data is recorded into the common area. If it is possible to correctly record the information that is essential to the utilization of the data into the common area, it means that, the semiconductor memory chip 100 has been authenticated by the writing device 300. Also, if the controller 200 is able to correctly read the information that is essential to the utilization of the data and that has been recorded in the common area, it means that, the controller 200 has been authenticated by the semiconductor memory chip 100. The trust chain shown in FIG. 1 is thus completed.

FIG. 2 is a block diagram of exemplary configurations of the semiconductor memory chip 100 and the controller 200 according to the first embodiment. First, an overview of functions of the semiconductor memory chip 100 will be explained. As shown in FIG. 2, the semiconductor memory chip 100 includes a memory 110, an encryption key sharing unit 120, a sending control unit 130, and a data converting unit 140.

The memory 110 is a storage unit that stores various types of data therein. The memory 110 may be configured with, for example, a NAND flash memory. The configuration of the memory 110 is not limited to this example; an arbitrary semiconductor memory that is configured with a semiconductor element (including any other type of flash memory) is applicable.

The memory 110 includes a code storage unit 111, a reading special area 112, a writing special area 113, a common area 114, and a general area 115.

The code storage unit 111 stores therein an Error Correction Code (ECC) of the data for which a writing process has been requested by the writing device 300. The code storage unit 111 may be provided on the outside of the memory 110, as a storage unit that is independent from the memory 110.

In FIG. 2, an example is shown in which the reading special area 112 and the writing special area 113 each include an area other than the common area 114; however, as long as at least the common area 114 is present, it is possible to configure each of the areas in an arbitrary manner. For example, an arrangement is acceptable in which the reading special area 112 and the writing special area 113 coincide with each other (i.e., both the reading special area 112 and the writing special area 113 coincide with the common area 114).

The general area 115 is an area to and from which the controller 200 is able to write and read data directly, without an intermediation of the sending control unit 130 and the data converting unit 140.

The encryption key sharing unit 120 stores therein or generates an encryption key to be shared with the controller 200. The sending control unit 130 controls the process of sending the data that has been read from the memory 110 to the controller 200. The data converting unit 140 generates converted data obtained by converting the data for which a writing process has been requested by the writing device 300 via the controller 200. The encryption key sharing unit 120, the sending control unit 130, and the data converting unit 140 are structured on the same die as the one on which the memory 110 is provided. With these arrangements, it is possible to provide the semiconductor memory chip 100 with a security function and to prevent illegitimate use of data that is realized by, for example, counterfeiting memory cards. Details of the functions of the encryption key sharing unit 120, the sending control unit 130, and the data converting unit 140 will be explained later.

Next, an overview of functions of the controller 200 will be explained. The controller 200 includes an encryption key sharing unit 210, a reading control unit 220, a writing control unit 230, a general area reading unit 240, and a general area writing unit 250.

The encryption key sharing unit 210 stores therein or generates an encryption key to be shared with the semiconductor memory chip 100. The reading control unit 220 controls the process of reading data from the common area 114 in the semiconductor memory chip 100, in response to a request from an external device (not shown) such as a reading device or a playback device. The writing control unit 230 controls the process of writing data into the common area 114 in the semiconductor memory chip 100, in response to a request from an external device such as the writing device 300.

The general area reading unit 240 controls the reading of data from the general area 115. In other words, when data is to be read from the general area 115, the reading device inputs a designation of a reading target page to the general area reading unit 240 included in the controller 200.

The general area reading unit 240 reads the data in the designated page, and also, reads the ECC that corresponds to the designated page from the code storage unit 111. Also, the general area reading unit 240 checks for errors in the page that has been read, by using the ECC. If there is no error, the general area reading unit 240 outputs the data in the read page. If there are one or more errors, and the errors are correctable, the general area reading unit 240 corrects the data in the read page and outputs the data. Otherwise, the general area reading unit 240 outputs an error code.

The general area writing unit 250 controls the writing of data into the general area 115. In other words, when data is to be written into the general area 115, the writing device 300 inputs the data to the general area writing unit 250 included in the controller 200. In this situation, the writing device 300 also inputs a designation of the writing destination page (i.e., an area within the memory) to the general area writing unit 250.

The general area writing unit 250 generates an ECC of the input data, writes the data into the designated page within the general area 115, and records the generated ECC into the code storage unit 111 as the ECC that corresponds to the designated page.

Next, exemplary configurations of the encryption key sharing unit 120 included in the semiconductor memory chip 100 and the encryption key sharing unit 210 included in the controller 200 will be explained, with reference to FIG. 3. As shown in FIG. 3, the encryption key sharing unit 120 stores therein a KM 121 (hereinafter, the "media key KM") denoting a media key and a media key block (MKB) 122. For example, the MKB 122 is described in the following document: 4C Entity, LLC. "Content Protection for Recordable Media Specification, SD Memory Card Book, Common Part", Revision 0.961, May 3, 2007. Further, the encryption key sharing unit 210 stores therein a KD 212 denoting a device key. Also, the encryption key sharing unit 210 includes an MKB reading unit 211 and an MKB processing unit 213.

The MKB reading unit 211 reads the MKB 122 from the encryption key sharing unit 120 included in the semiconductor memory chip 100. By processing the read MKB while using the device key KD 212, the MKB processing unit 213 performs MKB processing to derive the media key KM.

In the example shown in FIG. 3, the encryption key sharing unit 120 included in the semiconductor memory chip 100 authenticates the encryption key sharing unit 210 included in the controller 200.

Figure 4:
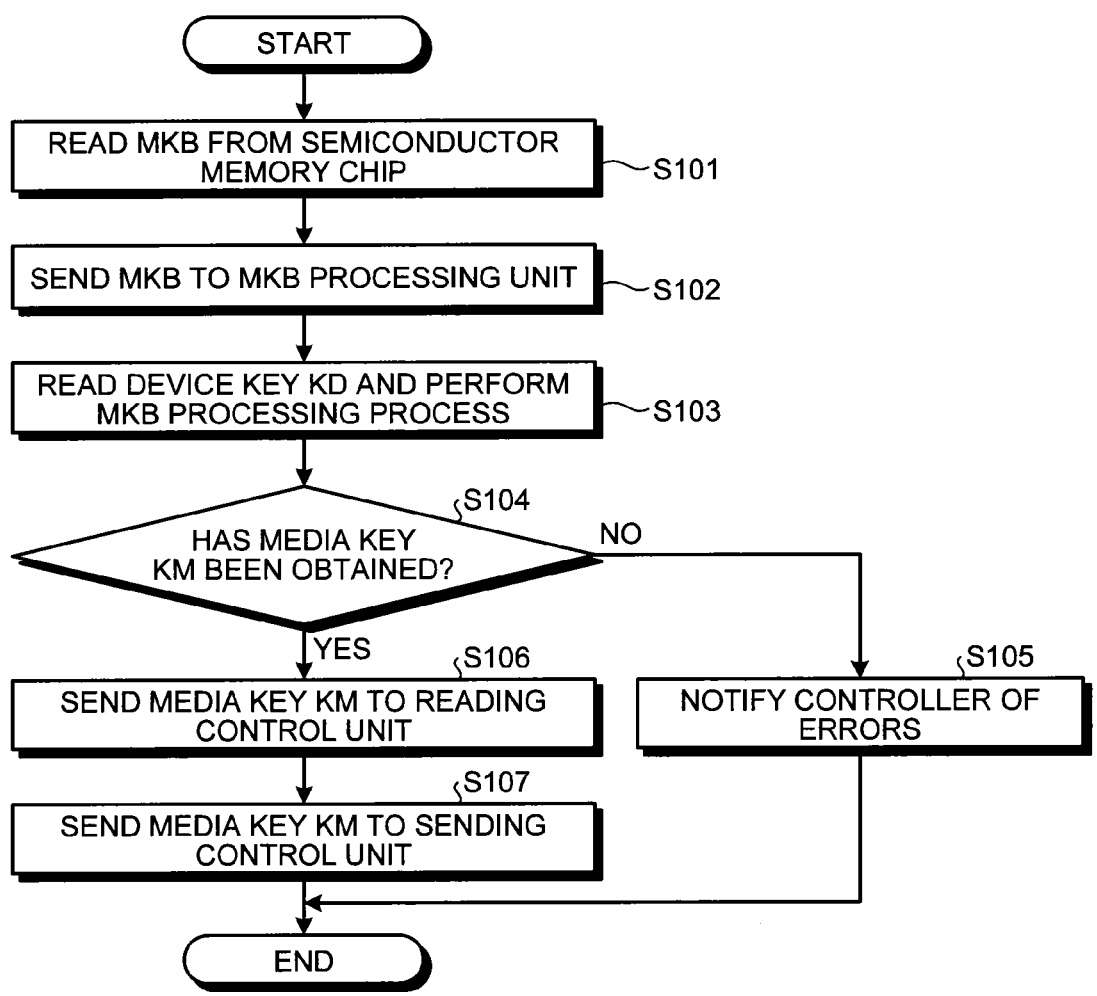
FIG. 4 is a flowchart of an entire flow in an encryption key sharing process according to the first embodiment.

Next, an encryption key sharing process in which the encryption key sharing unit 120 and the encryption key sharing unit 210 that are configured as shown in FIG. 3 share the encryption key will be explained with reference to FIG. 4. FIG. 4 is a flowchart of an entire flow in the encryption key sharing process according to the first embodiment.

When the controller 200 needs to read data from the reading special area 112 in the semiconductor memory chip 100, the MKB reading unit 211 included in the encryption key sharing unit 210 in the controller 200 reads the MKB 122 stored in the semiconductor memory chip 100 (step S101). The MKB 122 is always free to be read by the controller 200. The MKB reading unit 211 sends the read MKB 122 to the MKB processing unit 213 (step S102).

The MKB processing unit 213 reads the device key KD 212 stored in the encryption key sharing unit 210 included in the controller 200 and performs MKB processing (step S103). After that, the MKB processing unit 213 judges whether the media key KM has been obtained as a result of the MKB processing (step S104). In the case where the device key KD 212 has been revoked by the MKB 122, it is not possible to correctly obtain the media key KM as a result of the MKB processing. In that situation, the MKB processing unit 213 judges that the media key KM has not been obtained (step S104: No) and notifies the controller 200 of an error (step S105). When the controller 200 has received the notification of an error, the controller 200 cancels the reading operation.

In contrast, in the case where the device key KD 212 has not been revoked by the MKB 122, it is possible to obtain the correct media key KM as a result of the MKB processing. In that situation, the MKB processing unit 213 judges that the media key KM has been obtained (step S104: Yes) and sends the obtained media key KM to the reading control unit 220 included in the controller 200 (step S106). Also, on the semiconductor memory chip 100 side, the media key KM stored in the encryption key sharing unit 120 is sent to the sending control unit 130 (step S107).

Figure 5:
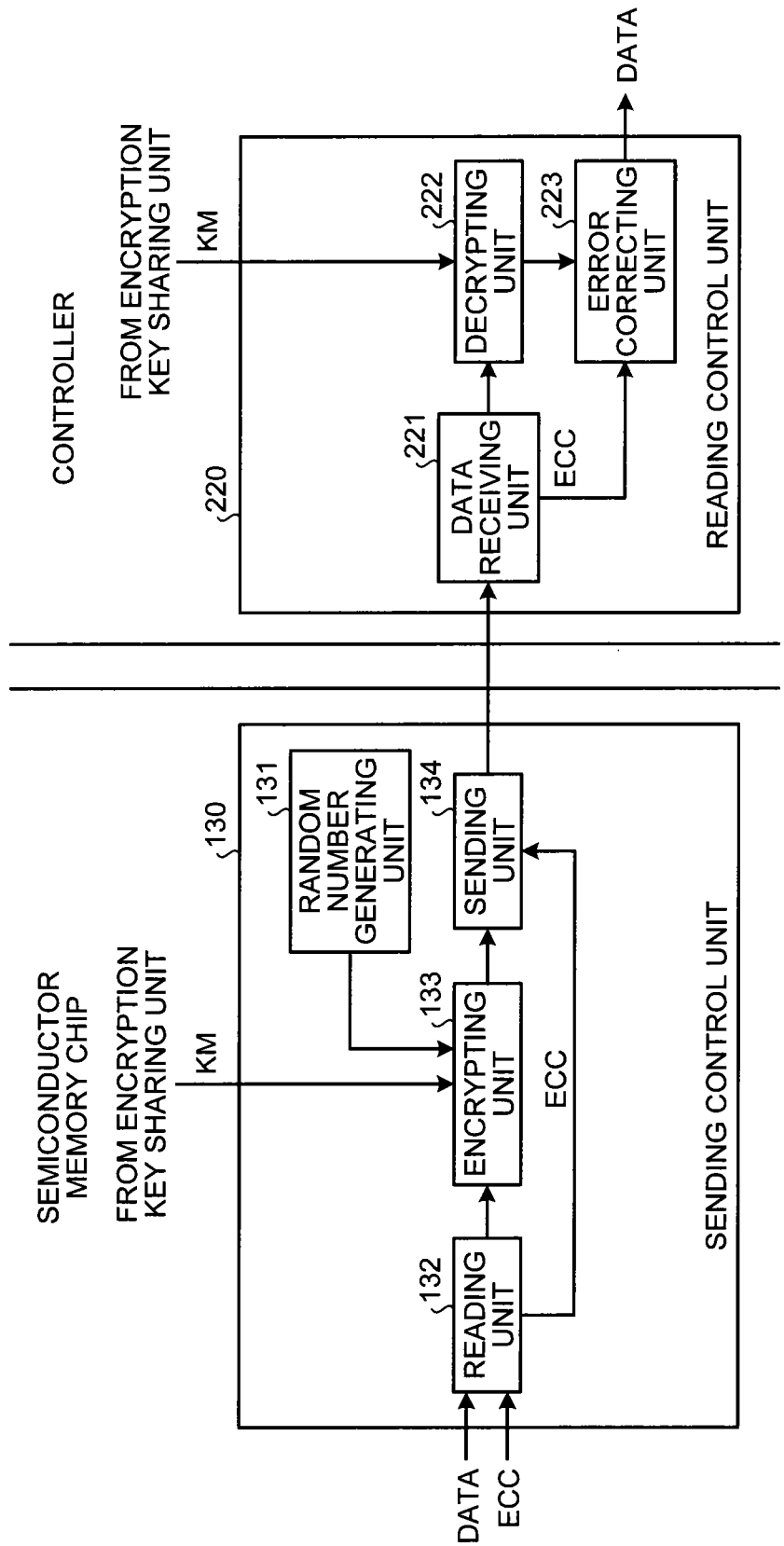
FIG. 5 is a diagram of exemplary configurations of a sending control unit and a reading control unit.

Next, exemplary configurations of the sending control unit 130 included in the semiconductor memory chip 100 and the reading control unit 220 included in the controller 200 will be explained with reference to FIG. 5. As shown in FIG. 5, the sending control unit 130 includes a random number generating unit 131, a reading unit 132, an encrypting unit 133, and a sending unit 134.

The random number generating unit 131 generates a random number in response to a request from the encrypting unit 133. The reading unit 132 reads the data in the designated reading target page and the ECC of the data from the memory 110. The encrypting unit 133 encrypts the read data by using the media key KM. The sending unit 134 sends the data that has been encrypted (i.e., the encrypted data) and the ECC to a data receiving unit 221 included in the controller 200.

Further, as shown in FIG. 5, the reading control unit 220 includes the data receiving unit 221, a decrypting unit 222, and an error correcting unit 223. The data receiving unit 221 receives the encrypted data and the ECC from the sending unit 134 included in the semiconductor memory chip 100. The decrypting unit 222 decrypts the received encrypted data by using the media key KM. The error correcting unit 223 checks to see if there are any errors in the decrypted data and corrects the errors by using the received ECC.

Figure 6:
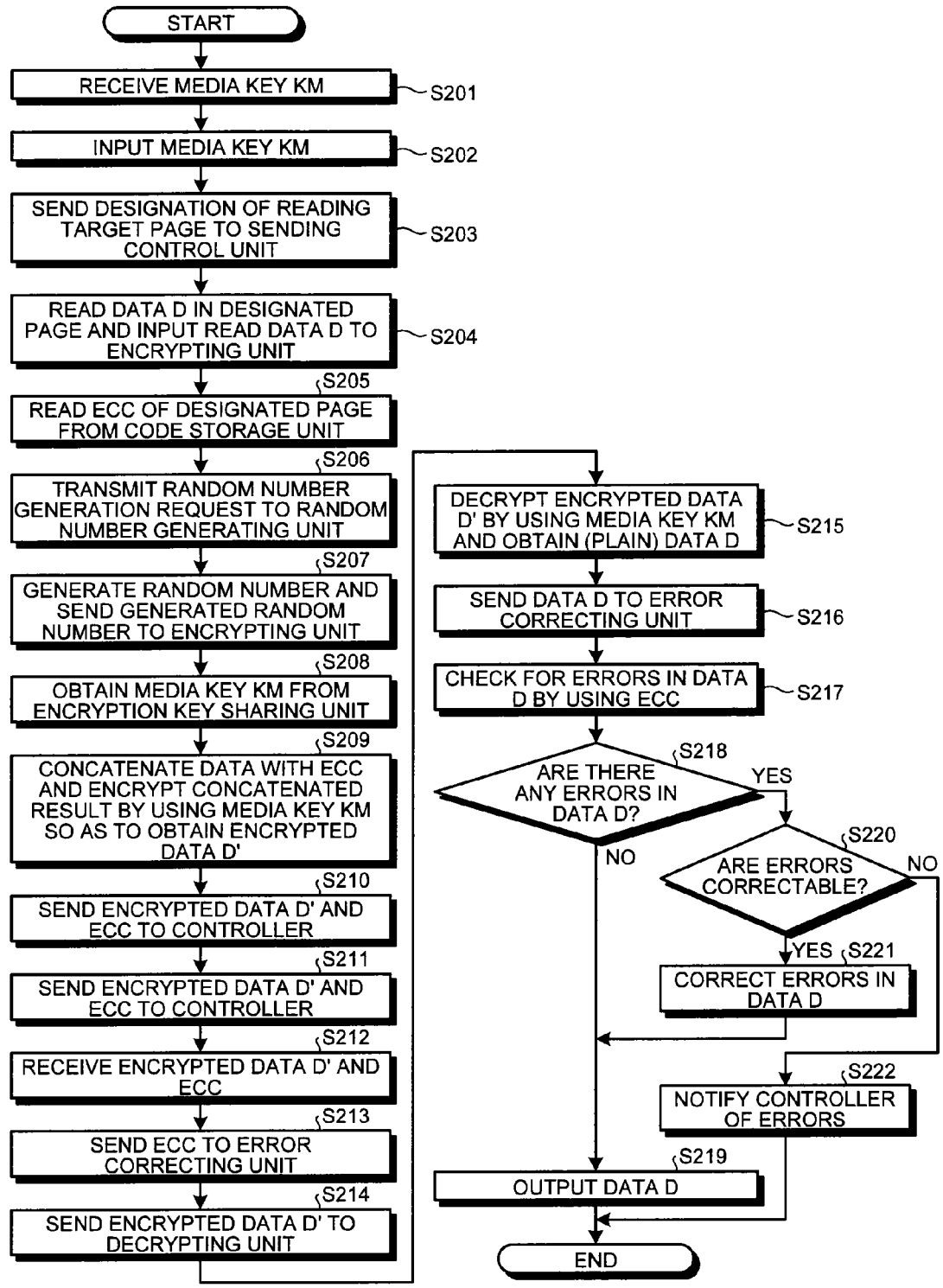
FIG. 6 is a flowchart of an entire flow in a data reading process according to the first embodiment.

Next, a data reading process in which the data that has been read is transmitted and received between the sending control unit 130 and the reading control unit 220 that are configured as shown in FIG. 5 will be explained, with reference to FIG. 6. FIG. 6 is a flowchart of an entire flow in the data reading process according to the first embodiment.

When the reading control unit 220 has received the media key KM from the encryption key sharing unit 210 (step S201), the reading control unit 220 inputs the received media key KM to the decrypting unit 222 (step S202). After that, the reading control unit 220 sends a data sending request to the sending control unit 130. At this time, a designation of the reading target page is also sent together (step S203). The reading unit 132 included in the sending control unit 130 reads the data in the designated page and inputs the read data to the encrypting unit 133 (step S204). Further, the reading unit 132 reads the ECC that corresponds to the reading target page from the code storage unit 111 and inputs the read ECC to the sending unit 134 (step S205).

Subsequently, the encrypting unit 133 sends a random number generation request to the random number generating unit 131 (step S206). The random number generating unit 131 generates a random number and sends the generated random number to the encrypting unit 133 (step S207). The encrypting unit 133 obtains the media key KM from the encryption key sharing unit 120 (step S208). The encrypting unit 133 concatenates the data in the designated page with the random number and generates encrypted data D' by encrypting the data resulting from the concatenating process while using the media key KM (step S209). After that, the encrypting unit 133 sends the encrypted data D' to the sending unit 134 (step S210). The sending unit 134 sends the encrypted data D' that has been input thereto as well as the ECC that has been input thereto to the data receiving unit 221 included in the controller 200 (step S211).

There is a possibility that important data in the reading target page may only be in a part of the page. In that situation, another arrangement is acceptable in which the encrypting unit 133 encrypts only the part of the page that contains the important data. For example, in the case where only 48 bytes at the head of the page is important data, an arrangement is acceptable in which the encrypting unit 133 encrypts only 64-byte data obtained by concatenating the 48-byte data at the head of the page with a 16-byte random number. With this arrangement, it is possible to keep at minimum the increase in the processing load caused by the encrypting process.

Subsequently, the data receiving unit 221 included in the reading control unit 220 receives the encrypted data and the ECC (step S212). After that, the data receiving unit 221 sends the received ECC to the error correcting unit 223 (step S213). The error correcting unit 223 stores therein the received ECC. Further, the data receiving unit 221 sends the received encrypted data D' to the decrypting unit 222 (step S214). The decrypting unit 222 decrypts the encrypted data D' by using the media key KM that has been received from the encryption key sharing unit 210 included in the controller 200 (step S215).

As a result of the decrypting process, the read data D that is plain data and the random number are obtained. The decrypting unit 222 is able to distinguish, in the decrypted data, the read data D from the random number, according to a predetermined format. For example, in the example described above in which the encrypting unit 133 encrypts only the 64 bytes, the 48 bytes at the head of the decrypted data represent the read data D, whereas the following 16 bytes represent the random number.

The decrypting unit 222 transfers only the read data D to the error correcting unit 223 (step S216). The error correcting unit 223 checks for errors in the read data D by using the ECC stored therein (step S217). The error correcting unit 223 then judges whether there are any errors (step S218). In the case where there is no error (step S218: No), the controller 200 outputs the read data D to the external device that has requested the reading of the read data D (step S219).

In the case where there are one or more errors (step S218: Yes), the error correcting unit 223 further judges whether the errors are correctable (step S220). In the case where the errors are correctable (step S220: Yes), the error correcting unit 223 corrects the errors in the read data D by using the ECC stored therein (step S221). After that, the controller 200 outputs the read data D that has been corrected (step S219).

In the case where the errors are not correctable (step S220: No), the error correcting unit 223 notifies the controller 200 of the errors (step S222). In that situation, the controller 200 transmits, for example, information indicating that the errors have occurred to the external device that has requested the reading of the data.

As a result of the process explained with reference to FIG. 4, only the legitimate controller 200 having the valid device key KD 212 is able to obtain the media key KM, which is the encryption key shared with the semiconductor memory chip 100. Also, as a result of the process explained with reference to FIG. 6, only the legitimate controller 200 is able to obtain the data that has properly been decrypted by using the common media key KM. In other words, it is possible to realize the configuration in which the controller 200 is authenticated by the semiconductor memory chip 100.

As explained above, the set made up of the encryption key sharing unit 120 and the sending control unit 130 that are included in the semiconductor memory chip 100 is considered to be an authenticating unit that authenticates the controller 200. The area in the memory 110 within the semiconductor memory chip 100 that stores therein the data read by the authenticating unit corresponds to the reading special area.

The configurations of the encryption key sharing unit 120 and the encryption key sharing unit 210 are not limited to the ones shown in FIG. 3. Any other configurations are applicable as long as the configuration allows the encryption key to be shared between the semiconductor memory chip 100 and the controller 200.

Figure 7:
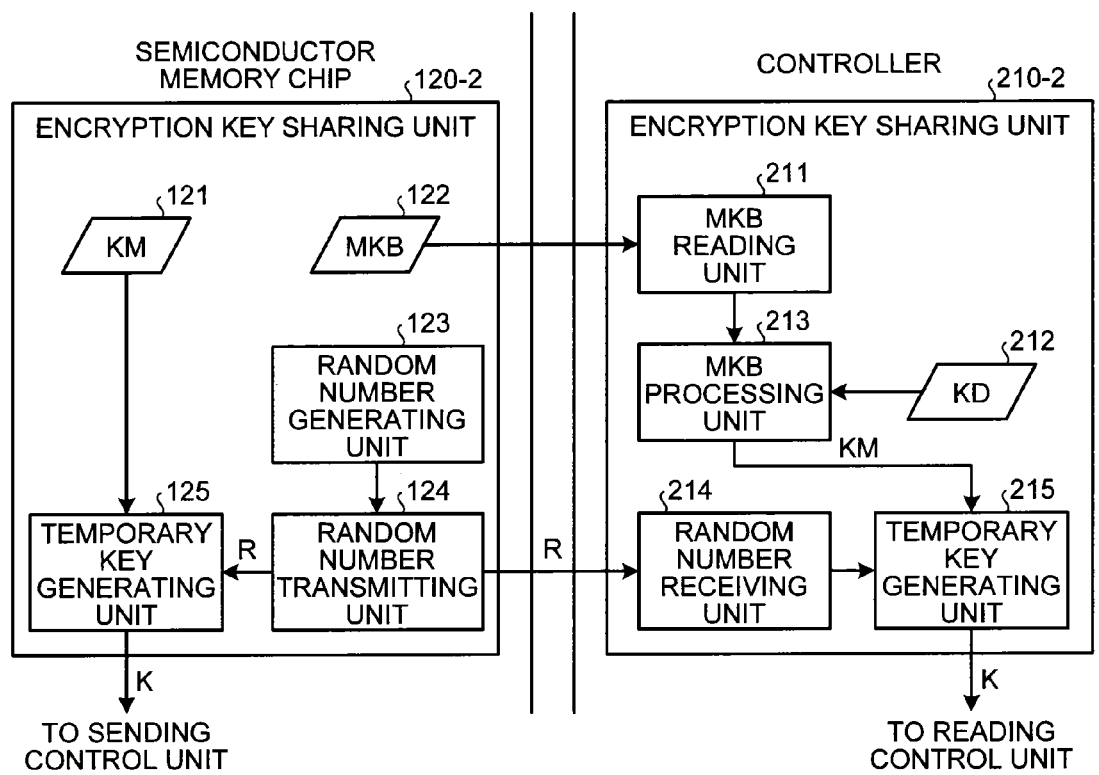
FIG. 7 is a diagram of modification examples of encryption key sharing units.

FIG. 7 is a block diagram of a modification example (i.e., an encryption key sharing unit 120-2) of the encryption key sharing unit 120 and a modification example (i.e., an encryption key sharing unit 210-2) of the encryption key sharing unit 210. As shown in FIG. 7, the encryption key sharing unit 120-2 stores therein the media key KM and the MKB 122. Further, the encryption key sharing unit 120-2 includes a random number generating unit 123, a random number transmitting unit 124, and a temporary key generating unit 125. Further, the encryption key sharing unit 210-2 includes the device key KD 212, the MKB reading unit 211, the MKB processing unit 213, as well as a random number receiving unit 214 and a temporary key generating unit 215.

The random number generating unit 123 generates a random number in response to a request from the random number transmitting unit 124. The random number transmitting unit 124 transmits the generated random number to the random number receiving unit 214 included in the controller 200 and to the temporary key generating unit 125 included in the semiconductor memory chip 100. The temporary key generating unit 125 generates a temporary key K by using the media key KM and the received random number. For example, the temporary key generating unit 125 generates the temporary key K from the media key KM and the random number, by using a one-way function such as Advanced Encryption Standard-G (AES-G).

The random number receiving unit 214 receives the random number from the random number transmitting unit 124. By using the same method as the one used by the temporary key generating unit 125 included in the semiconductor memory chip 100, the temporary key generating unit 215 generates the temporary key K from the media key that has been received from the MKB processing unit 213 and the random number that has been received by the random number receiving unit 214.

In the example shown in FIG. 7, the encryption key sharing unit 120-2 included in the semiconductor memory chip 100 authenticates the encryption key sharing unit 210-2 included in the controller 200.

Figure 8:
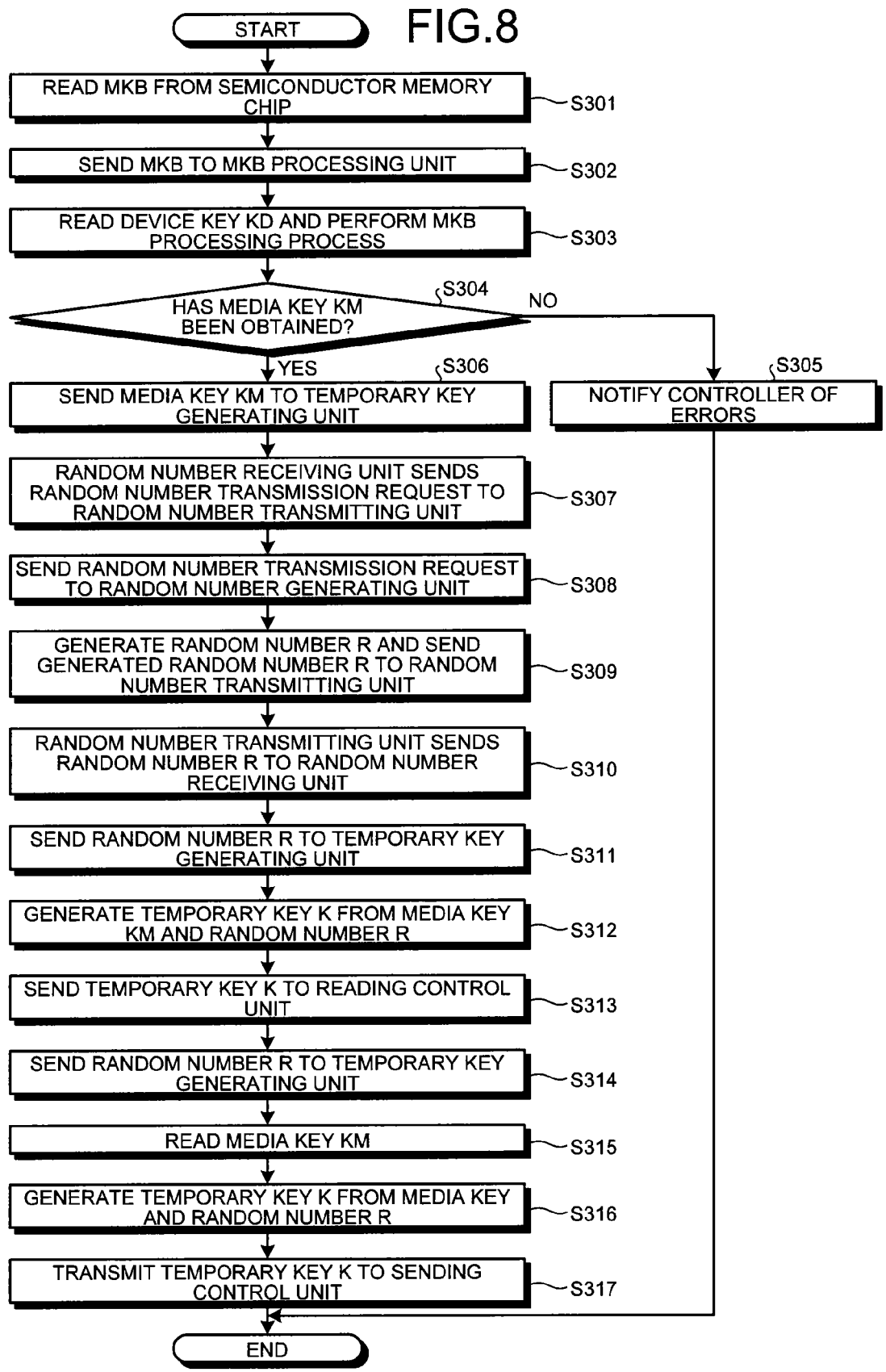
FIG. 8 is a flowchart of an entire flow in an encryption key sharing process according to a modification example of the first embodiment.

Next, an encryption key sharing process in which the encryption key sharing unit 120-2 and the encryption key sharing unit 210-2 that are configured as shown in FIG. 7 share the encryption key will be explained with reference to FIG. 8. FIG. 8 is a flowchart of an entire flow in the encryption key sharing process according to the modification example of the first embodiment.

The process performed at steps S301 through S305 is the same as the process performed at steps S101 through S105 shown in FIG. 4. Thus, the explanation thereof will be omitted.

In the case where it has been judged, at step S304, that the correct media key KM has been obtained (step S304: Yes), the MKB processing unit 213 sends the obtained media key KM to the temporary key generating unit 215 (step S306). After that, the random number receiving unit 214 included in the encryption key sharing unit 210 in the controller 200 sends a random number transmission request to the random number transmitting unit 124 included in the semiconductor memory chip 100 (step S307). The random number transmitting unit 124 sends a random number generation request to the random number generating unit 123 (step S308). The random number generating unit 123 generates a random number R (step S309). The random number transmitting unit 124 receives the generated random number R and transmits the random number R to the random number receiving unit 214 included in the controller 200 (step S310). The random number receiving unit 214 included in the controller 200 transfers the received random number R to the temporary key generating unit 215 included in the controller 200 (step S311). The temporary key generating unit 215 generates the temporary key K from the media key KM that has been received from the MKB processing unit 213 and the random number R (step S312). Further, the temporary key generating unit 215 sends the generated temporary key K to the reading control unit 220 included in the controller 200 (step S313).

In addition, the random number transmitting unit 124 also sends the random number R to the temporary key generating unit 125 included in the semiconductor memory chip 100 (step S314). The temporary key generating unit 125 that has received the random number R reads the media key KM that is stored in advance in the encryption key sharing unit 120 included in the semiconductor memory chip 100 (step S315). After that, the temporary key generating unit 125 generates the temporary key K by combining the media key KM with the random number R (step S316). Further, the temporary key generating unit 125 sends the generated temporary key K to the sending control unit 130 included in the semiconductor memory chip 100 (step S317).

When the MKB processing has correctly been performed by the controller 200 so that the correct media key KM is generated, the temporary keys K that are generated by the semiconductor memory chip 100 and by the controller 200 independently should be the same.

Figure 9:
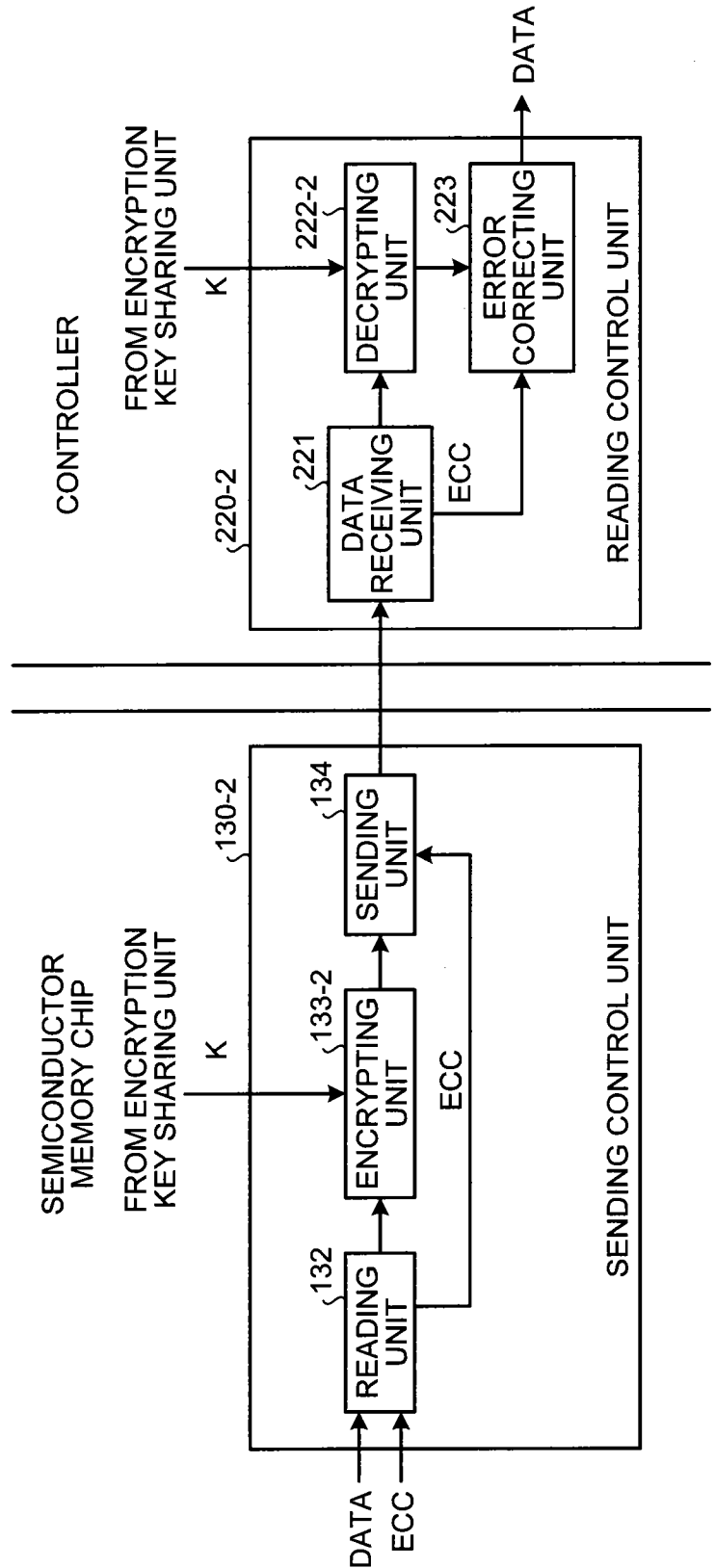
FIG. 9 is a diagram of a modification example of a sending control unit and a reading control unit.

Next, a modification example (i.e., a sending control unit 130-2) of the sending control unit 130 and a modification example (i.e., a reading control unit 220-2) of the reading control unit 220 that correspond to the encryption key sharing unit 120-2 and the encryption key sharing unit 210-2 that are configured as shown in FIG. 7 will be explained, with reference to FIG. 9. As shown in FIG. 9, the sending control unit 130-2 includes the reading unit 132, an encrypting unit 133-2, and the sending unit 134. The sending control unit 130-2 according to the present modification example is different from the sending control unit 130 shown in FIG. 5 in that the random number generating unit 131 is eliminated and that the encrypting unit 133-2 has a different function. A major difference between the encrypting unit 133-2 and the encrypting unit 133 shown in FIG. 5 is that the encrypting unit 133-2 encrypts the data by using the temporary key K, instead of the media key KM.

Further, as shown in FIG. 9, the reading control unit 220-2 includes the data receiving unit 221, a decrypting unit 222-2, and the error correcting unit 223. The reading control unit 220-2 according to the present modification example is different from the reading control unit 220 shown in FIG. 5 with respect to the function of the decrypting unit 222-2. A major difference between the decrypting unit 222-2 and the decrypting unit 222 shown in FIG. 5 is that the decrypting unit 222-2 decrypts the data by using the temporary key K, instead of the media key KM.

Figure 10:
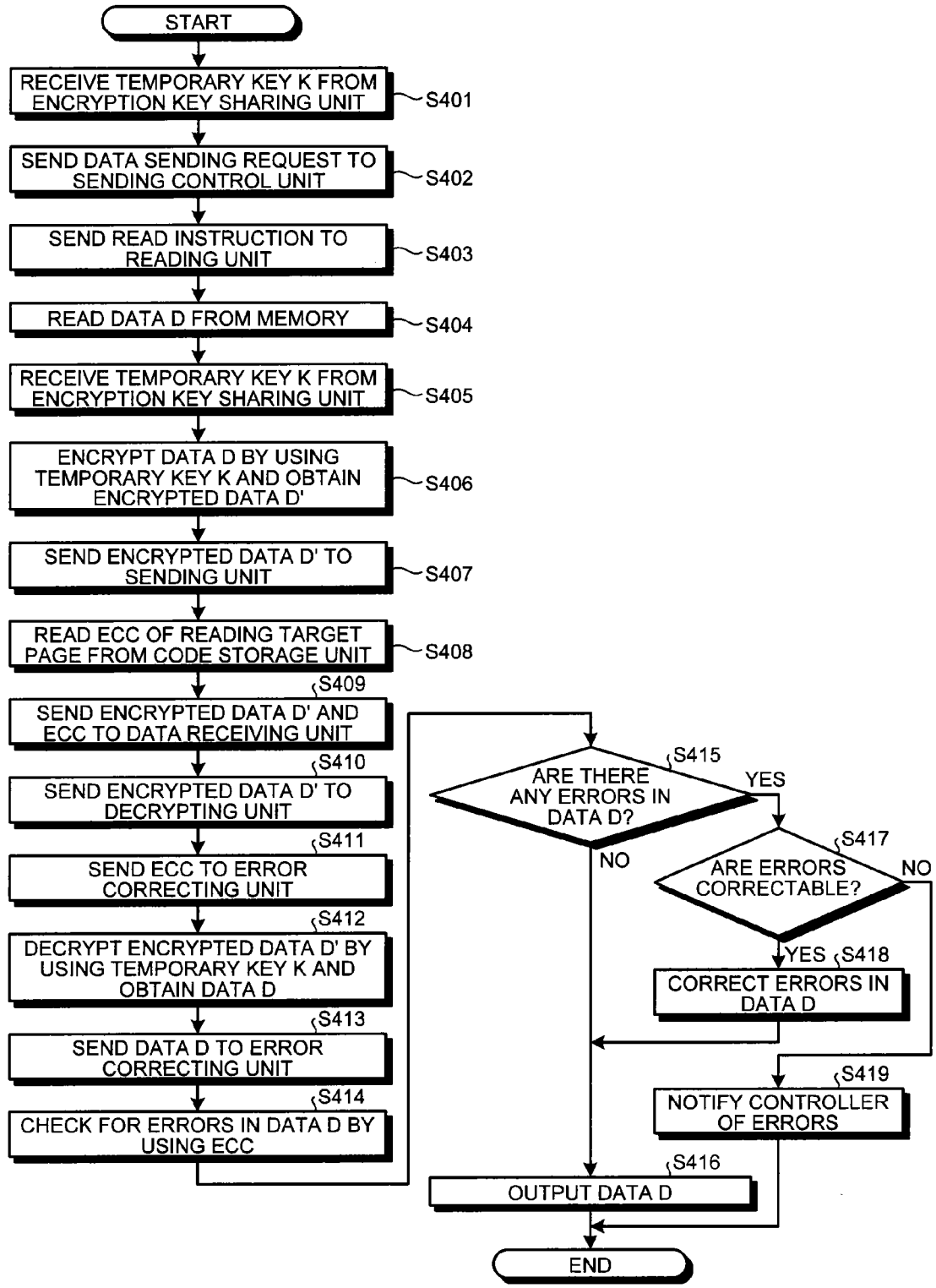
FIG. 10 is a flowchart of an entire flow in a data reading process according to a modification example of the first embodiment.

Next, a data reading process in which the data that has been read is transmitted and received between the sending control unit 130-2 and the reading control unit 220-2 that are configured as shown in FIG. 9 will be explained, with reference to FIG. 10. FIG. 10 is a flowchart of an entire flow in the data reading process according to the modification example of the first embodiment.

When the decrypting unit 222-2 included in the reading control unit 220-2 has received the temporary key K from the encryption key sharing unit 210-2 (step S401), the decrypting unit 222-2 stores therein the received temporary key K. Further, the data receiving unit 221 sends a data sending request to the sending control unit 130-2 included in the semiconductor memory chip 100, together with a designation of the reading target page (step S402). The sending control unit 130 sends the designation of the reading target page and a data read instruction to the reading unit 132 (step S403). The reading unit 132 reads the data D from the reading target page in the memory 110 (step S404).

The encrypting unit 133-2 receives the temporary key K from the encryption key sharing unit 120-2 (step S405). After that, the encrypting unit 133-2 encrypts the data D by using the temporary key K and generates encrypted data D'=Enc(K, D) (step S406). Enc(K, D) signifies that the data D is encrypted by using the temporary key K. The encrypting unit 133-2 sends the generated encrypted data D' to the sending unit 134 (step S407).

The reading unit 132 reads the ECC of the data D from the code storage unit 111 included in the memory 110 (step S408). The sending unit 134 stores therein the read ECC. The sending unit 134 sends the encrypted data D' and the stored ECC to the data receiving unit 221 included in the reading control unit 220-2 (step S409).

When the data receiving unit 221 has received the encrypted data D' and the ECC from the sending unit 134, the data receiving unit 221 sends the encrypted data D' to the decrypting unit 222-2 (step S410) and sends the ECC to the error correcting unit 223 (step S411). The error correcting unit 223 stores therein the received ECC. When the decrypting unit 222-2 has received the encrypted data D', the decrypting unit 222-2 decrypts the encrypted data D' by using the stored temporary key K and obtains the data D (step S412). After that, the decrypting unit 222-2 sends the data D resulting from the decrypting process to the error correcting unit 223 (step S413).

The process performed at steps S414 through S419 is the same as the process performed at steps S217 through S222 shown in FIG. 6. Thus, the explanation thereof will be omitted.

Figure 11:
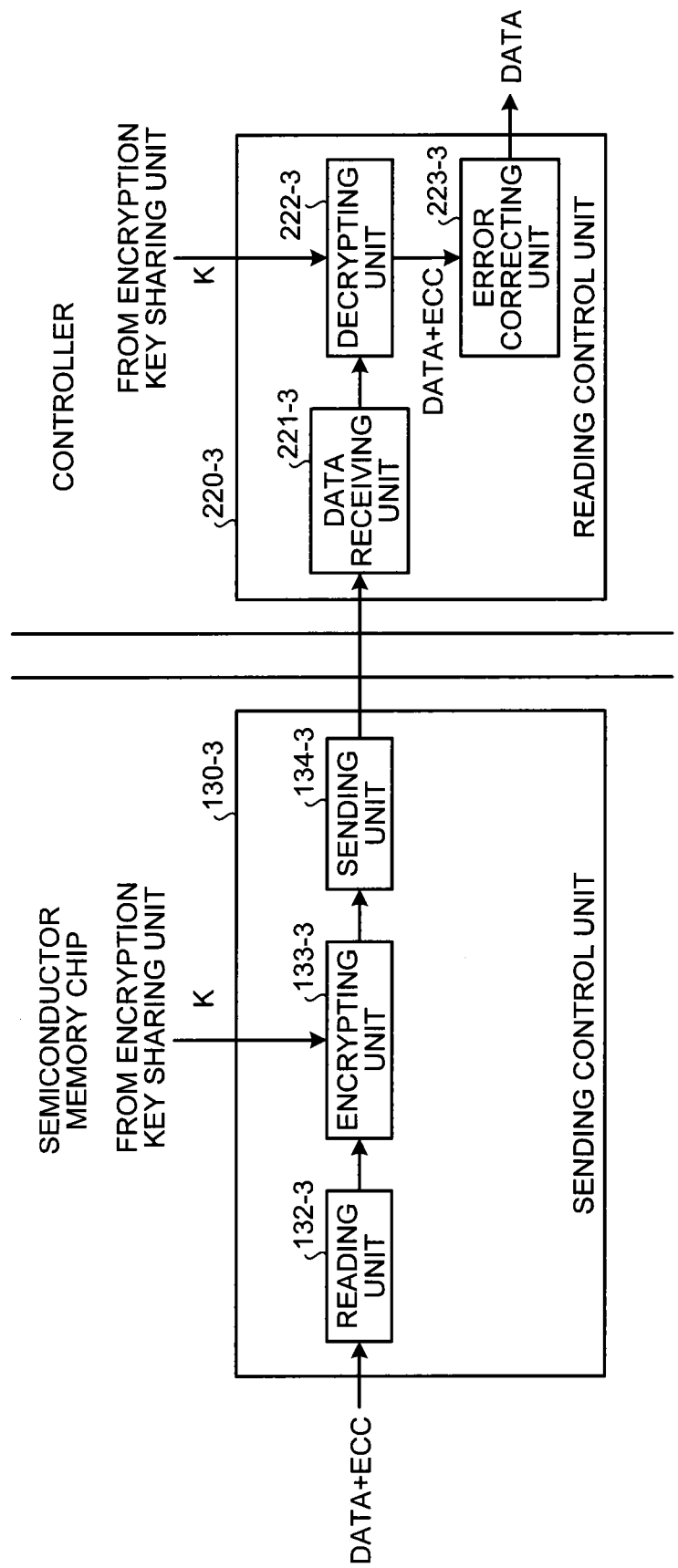
FIG. 11 is a diagram of another modification example of the sending control unit and the reading control unit.

Next, other modification examples (i.e., a sending control unit 130-3 and a reading control unit 220-3) of the sending control unit 130 and the reading control unit 220 that correspond to the encryption key sharing unit 120-2 and the encryption key sharing unit 210-2 that are configured as shown in FIG. 7 will be explained, with reference to FIG. 11. As shown in FIG. 11, the sending control unit 130-3 includes a reading unit 132-3, an encrypting unit 133-3, and a sending unit 134-3.

The reading unit 132-3 transmits the read ECC to the encrypting unit 133-3, not to the sending unit 134-3. The encrypting unit 133-3 encrypts the data obtained by concatenating the data D with the ECC. The sending unit 134-3 sends the data that has been encrypted in this manner to the reading control unit 220-3.

As shown in FIG. 11, the reading control unit 220-3 includes a data receiving unit 221-3, a decrypting unit 222-3, and an error correcting unit 223-3.

The data receiving unit 221-3 receives the encrypted data obtained by encrypting the data D and the ECC and transmits the received encrypted data to the decrypting unit 222-3. The decrypting unit 222-3 decrypts the encrypted data so as to obtain the data D and the ECC and transmits the data D and the ECC to the error correcting unit 223-3. The error correcting unit 223-3 performs a process to check for errors and to correct the errors, by using the data D and the ECC that have been received from the decrypting unit 222-3 in the manner described above.

Figure 12:
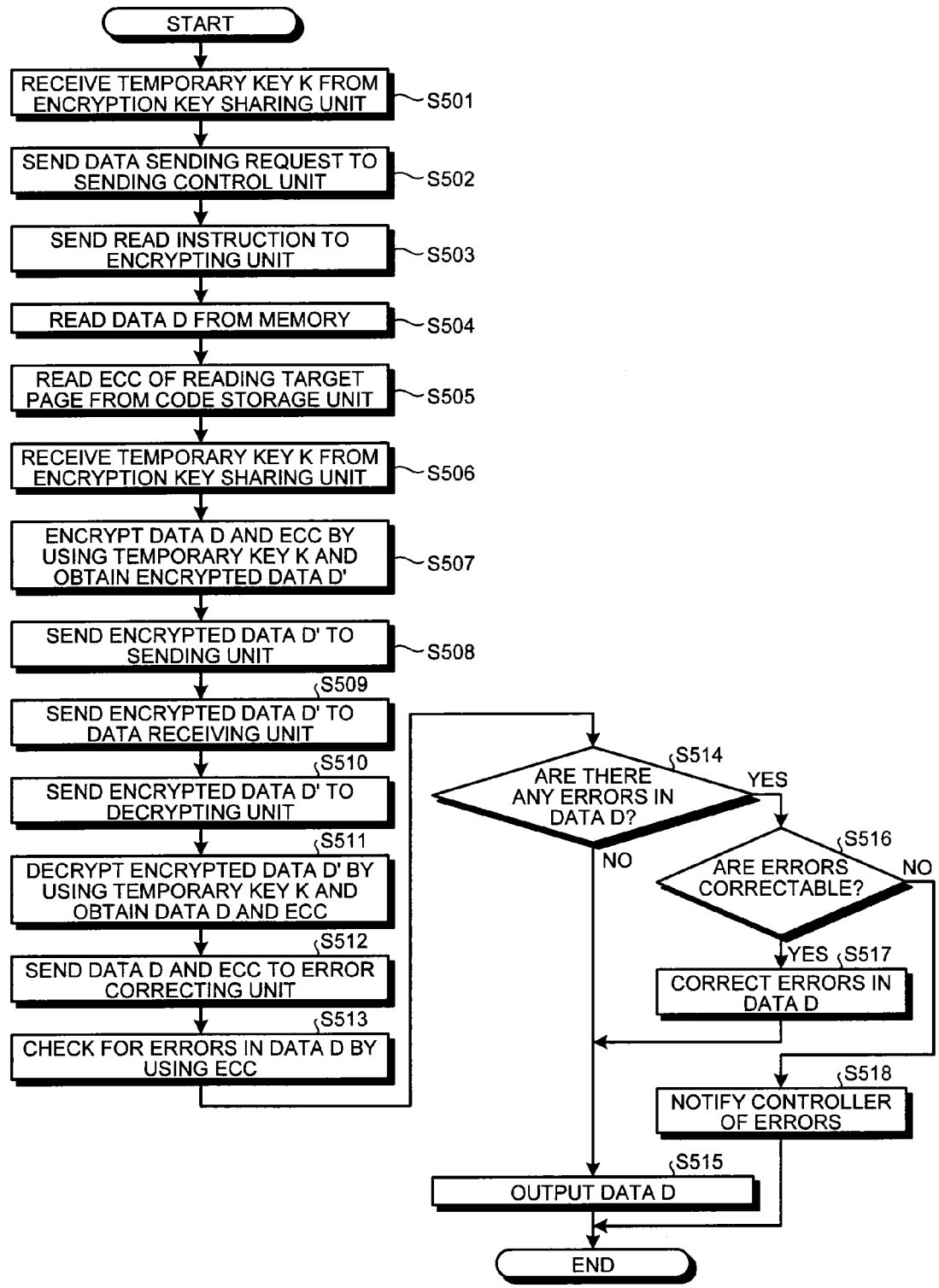
FIG. 12 is a flowchart of an entire flow in a data reading process according to another modification example of the first embodiment.

Next, a data reading process in which the data that has been read is transmitted and received between the sending control unit 130-3 and the reading control unit 220-3 that are configured as shown in FIG. 11 will be explained, with reference to FIG. 12. FIG. 12 is a flowchart of an entire flow in the data reading process according to another modification example of the first embodiment.

When the decrypting unit 222-3 included in the reading control unit 220 has received the temporary key K from the encryption key sharing unit 210-2 (step S501), the decrypting unit 222-3 stores therein the received temporary key K. Further, the data receiving unit 221-3 sends a data sending request to the sending control unit 130-3 included in the semiconductor memory chip 100, together with a designation of the reading target page (step S502). The sending control unit 130-3 sends the designation of the reading target page and a data read instruction to the reading unit 132-3 (step S503). The reading unit 132-3 reads the data D in the designated reading target page in the memory (step S504). Further, the reading unit 132-3 reads the ECC of the read data D from the code storage unit 111 included in the memory 110 (step S505). After that, the encrypting unit 133-3 receives the temporary key K from the encryption key sharing unit 120-2 (step S506). The encrypting unit 133-3 generates encrypted data D'=Enc(K, D∥ECC) by encrypting, while using the received temporary key K, data D∥ECC obtained by concatenating the data D with the ECC (step S507). After that, the encrypting unit 133-3 sends the encrypted data D' to the sending unit 134 (step S508). The sending unit 134 sends the encrypted data D' to the data receiving unit 221 included in the reading control unit 220 (step S509).

When the data receiving unit 221 has received the encrypted data D' from the sending unit 134, the data receiving unit 221 sends the encrypted data D' to the decrypting unit 222-3 (step S510). When the decrypting unit 222-3 has received the encrypted data D', the decrypting unit 222-3 decrypts the encrypted data D' by using the temporary key K stored therein and obtains the data D and the ECC (step S511). The decrypting unit 222-3 sends the data D and the ECC to the error correcting unit 223-3 (step S512).

The process performed at steps S513 through S518 is the same as the process performed at steps S217 through S222 shown in FIG. 6 (or at steps S414 through S419 shown in FIG. 10). Thus, the explanation thereof will be omitted.

The set made up of the encryption key sharing unit 120-2 shown in FIG. 7 and either the sending control unit 130-2 shown in FIG. 9 or the sending control unit 130-3 shown in FIG. 11 is considered to be an authenticating unit that authenticates the controller 200. The area in the memory 110 within the semiconductor memory chip 100 that stores therein the data read by the authenticating unit corresponds to the reading special area.

As described above, because the authenticating unit that authenticates the controller 200 by using the reading special area is provided, it is possible to prevent illegitimate use of the data that is realized by, for example, counterfeiting memory cards.

Next, in the following sections, a configuration to realize a situation where the semiconductor memory chip 100 is authenticated by the writing device 300 by using the writing special area 113 will be explained. With this configuration also, it is possible to prevent illegitimate use of data that is realized by, for example, counterfeiting memory cards. Further, by having an arrangement in which both the function to read data from the reading special area 112 (i.e., the common area) and the function to write data into the writing special area 113 (i.e., the common area) are provided, it is possible to incorporate the semiconductor memory chip 100 into a trust chain as described above. As a result, it is possible to further enhance the security function.

Figure 13:
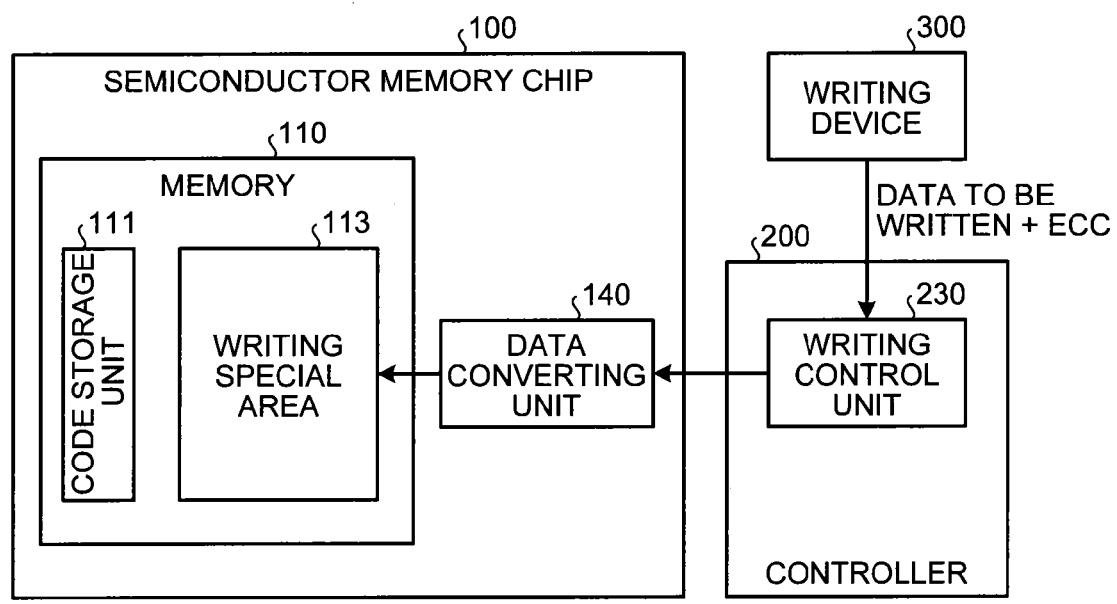
FIG. 13 is a diagram explaining a manner in which data is written into a writing special area.

FIG. 13 is a diagram explaining a manner in which data is written into the writing special area 113 in the semiconductor memory chip 100, while the writing device 300 is connected to the controller 200. It should be noted that only the part that is related to the writing process is shown in FIG. 13.

First, the writing device 300 transmits encrypted data obtained by encrypting the data (i.e., the data to be written) for which a writing process has been requested, a designation of a writing destination page, and an ECC that corresponds to the data to be written, to the controller 200. The writing control unit 230 included in the controller 200 sends the encrypted data and the ECC to the data converting unit 140 included in the semiconductor memory chip 100. The data converting unit 140 converts (i.e., decrypts) the encrypted data, writes the converted data that has been obtained (i.e., the data to be written) into the writing special area 113, and writes the ECC into the code storage unit 111.

Figure 14:
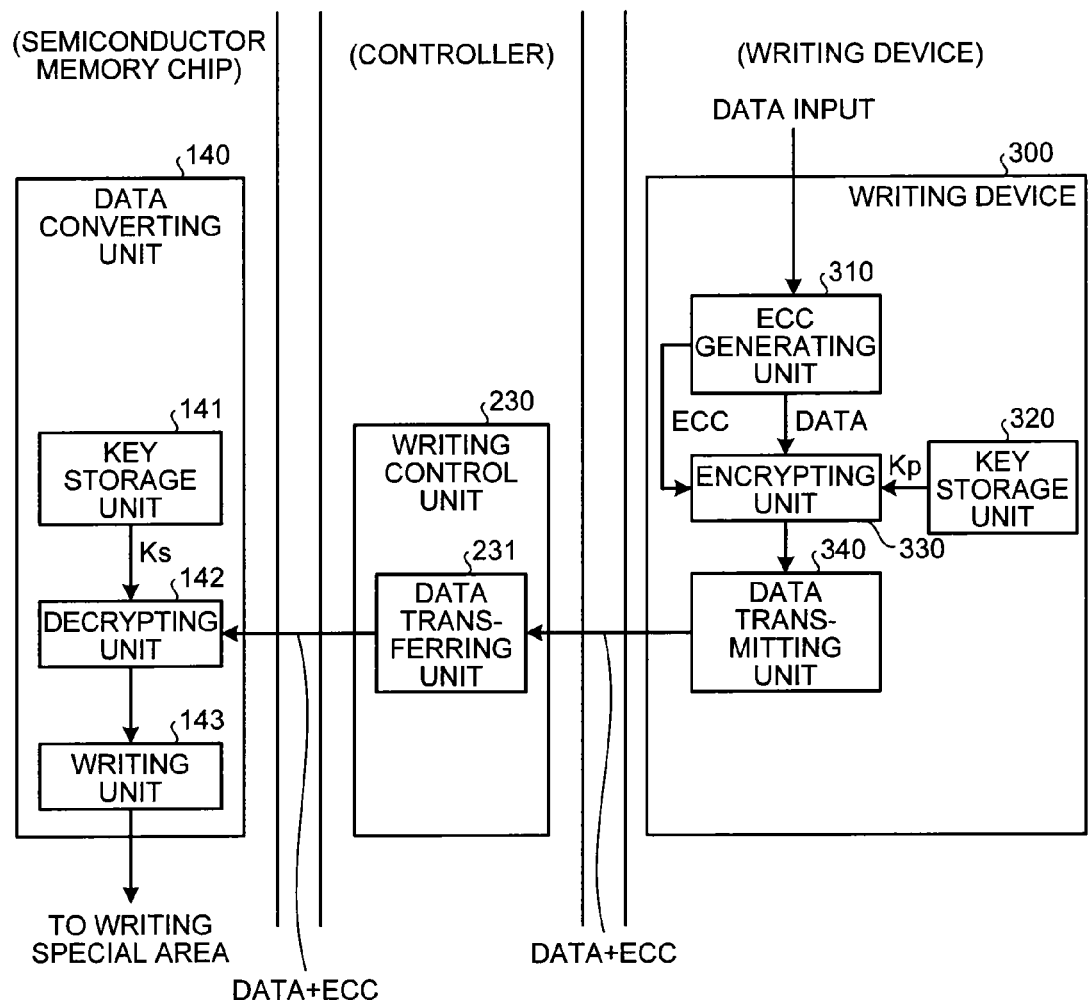
FIG. 14 is a diagram of exemplary configurations of a writing control unit and a data converting unit.

Next, exemplary configurations of the writing device 300, the writing control unit 230 included in the controller 200, and the data converting unit 140 included in the semiconductor memory chip 100 shown in FIG. 13 will be explained, with reference to FIG. 14. As shown in FIG. 14, the writing device 300 includes an ECC generating unit 310, a key storage unit 320, an encrypting unit 330, and a data transmitting unit 340.

The ECC generating unit 310 generates an ECC of the data to be written that has been input as the data that needs to be written. The key storage unit 320 stores therein a data conversion key (i.e., a first key) to be used for converting the data to be written. According to the first embodiment, the key storage unit 320 stores therein a public key Kp according to a public key method as the data conversion key. The public key Kp is a public key that corresponds to a secret key Ks, which is a data conversion key (i.e., a second key) stored in a key storage unit 141 (explained later) included in the semiconductor memory chip 100.

The encrypting method that is applicable is not limited to the public key method. In the following sections, an example will be explained in which the writing device 300 encrypts the data to be written by using the data conversion key (i.e., the public key Kp), whereas the semiconductor memory chip 100 decrypts the data to be written by using the corresponding data conversion key (i.e., the secret key Ks) and stores the decrypted data into the memory 110. As long as the writing device 300 converts the data by using the data conversion key (i.e., the first key), whereas the semiconductor memory chip 100 converts the converted data by using the data conversion key (i.e., the second key) corresponding to the first key, it is acceptable to apply any other converting method. For example, another arrangement is acceptable in which the writing device 300 performs a converting process being equivalent to a decrypting process by using the first key, whereas the semiconductor memory chip 100 performs a converting process being equivalent to an encrypting process by using the second key that corresponds to the first key.

The encrypting unit 330 encrypts the data to be written by using the public key Kp. Also, the encrypting unit 330 generates a code (i.e., a converted code) obtained by encrypting the ECC by using the public key Kp. In the following sections, the data to be written that has been encrypted may be referred to as "encrypted data", whereas the converted code obtained by encrypting the ECC may be referred to as "encrypted ECC". The data transmitting unit 340 transmits the encrypted data, the encrypted ECC, and a designation of the writing destination page to the writing control unit 230 included in the controller 200.

Next, an exemplary configuration of the writing control unit 230 included in the controller 200 will be explained. As shown in FIG. 14, the writing control unit 230 includes a data transferring unit 231. The data transferring unit 231 receives the encrypted data, the encrypted ECC, and the designation of the writing destination page and transmits these pieces of information to the data converting unit 140 included in the semiconductor memory chip 100.

Next, an exemplary configuration of the data converting unit 140 will be explained. As shown in FIG. 14, the data converting unit 140 includes a key storage unit 141, a decrypting unit 142, and a writing unit 143.

The key storage unit 141 stores therein the secret key Ks according to the public key method. The decrypting unit 142 decrypts the encrypted data and the encrypted ECC by using the secret key Ks stored in the key storage unit 141. The data to be written that has been obtained by decrypting the encrypted data corresponds to the converted data. The writing unit 143 records the data to be written that has been decrypted into the designated page in the writing special area 113 in the memory 110. Also, the writing unit 143 stores the decrypted ECC into the code storage unit 111 in the memory 110.

Figure 15:
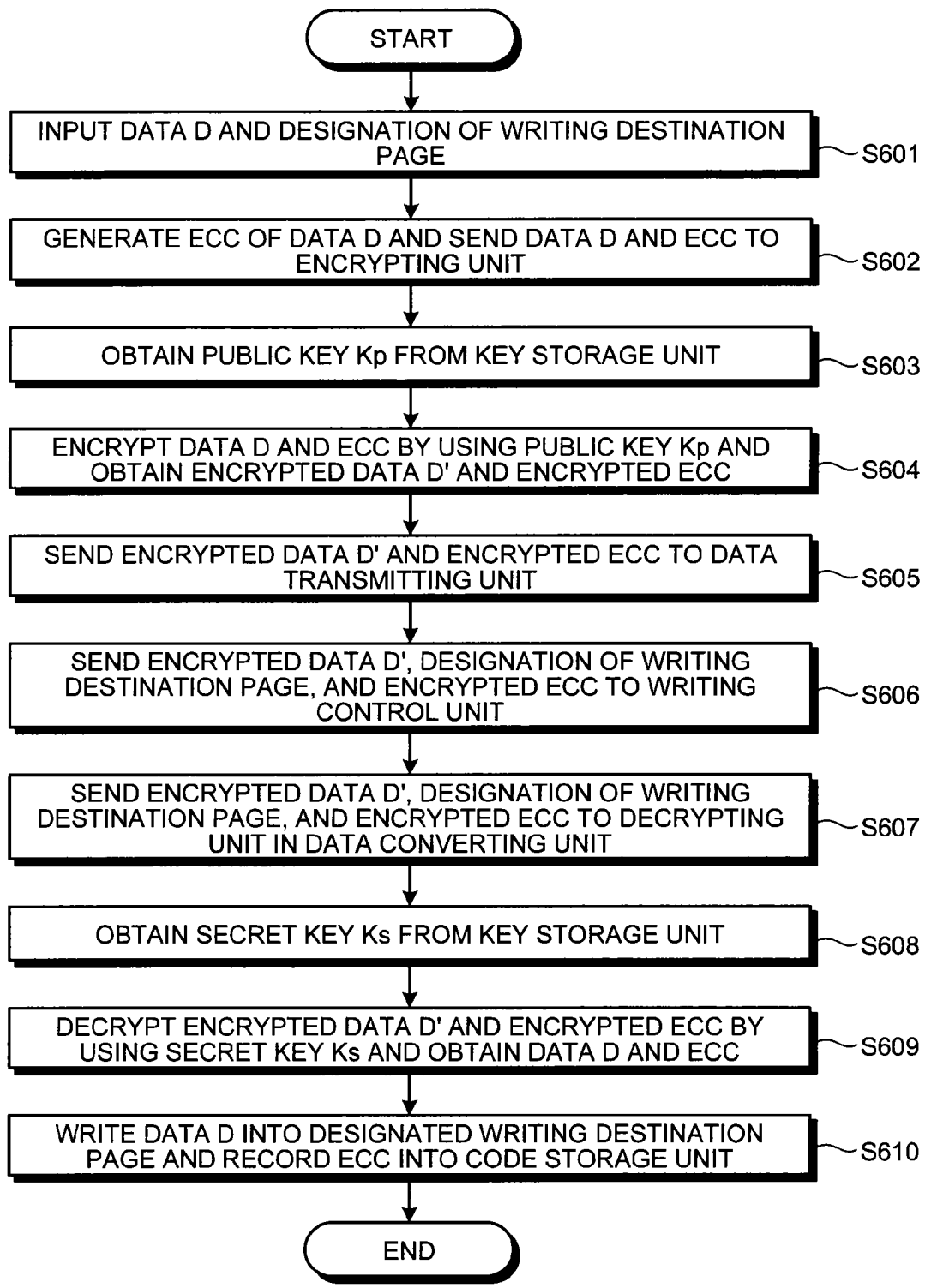
FIG. 15 is a flowchart of an entire flow in a writing process according to the first embodiment.

Next, a writing process that is performed on the data to be written and is performed by the writing device 300, the writing control unit 230, and the data converting unit 140 that are configured as shown in FIG. 14 will be explained, with reference to FIG. 15. FIG. 15 is a flowchart of an entire flow in the writing process according to the first embodiment.

The writing device 300 receives an input of the data to be written (i.e., the data D) and a designation of the writing destination page (step S601). After that, the ECC generating unit 310 generates an ECC of the data D and transfers the generated ECC and the data D to the encrypting unit 330 (step S602). The encrypting unit 330 obtains the public key Kp from the key storage unit 320 (step S603). Subsequently, the encrypting unit 330 encrypts the data D and the ECC by using the public key Kp and obtains encrypted data D' and an encrypted ECC (step S604). The encrypting unit 330 sends the encrypted data D' and the encrypted ECC to the data transmitting unit 340 (step S605). The data transmitting unit 340 transmits the encrypted data D', the designation of the writing destination page, and the encrypted ECC to the writing control unit 230 included in the controller 200 (step S606).

The data transferring unit 231 included in the writing control unit 230 receives the encrypted data D', the designation of the writing destination page, and the encrypted ECC and transmits these pieces of information to the data converting unit 140 included in the semiconductor memory chip 100 (step S607).

The encrypted data D' and the encrypted ECC that have been received by the data converging unit 140 are input to the decrypting unit 142. The decrypting unit 142 obtains the secret key Ks from the key storage unit 141 (step S608). After that, the decrypting unit 142 decrypts the encrypted data D' and the encrypted ECC by using the secret key Ks and obtains the data D and the ECC (step S609). Subsequently, the writing unit 143 records the data D resulting from the decrypting process into the page in the memory 110 that has been designated by the designation of the writing destination page. Also, the writing unit 143 stores the decrypted ECC into the code storage unit 111 included in the memory 110, as the ECC that corresponds to the designated page (step S610).

Figure 16:
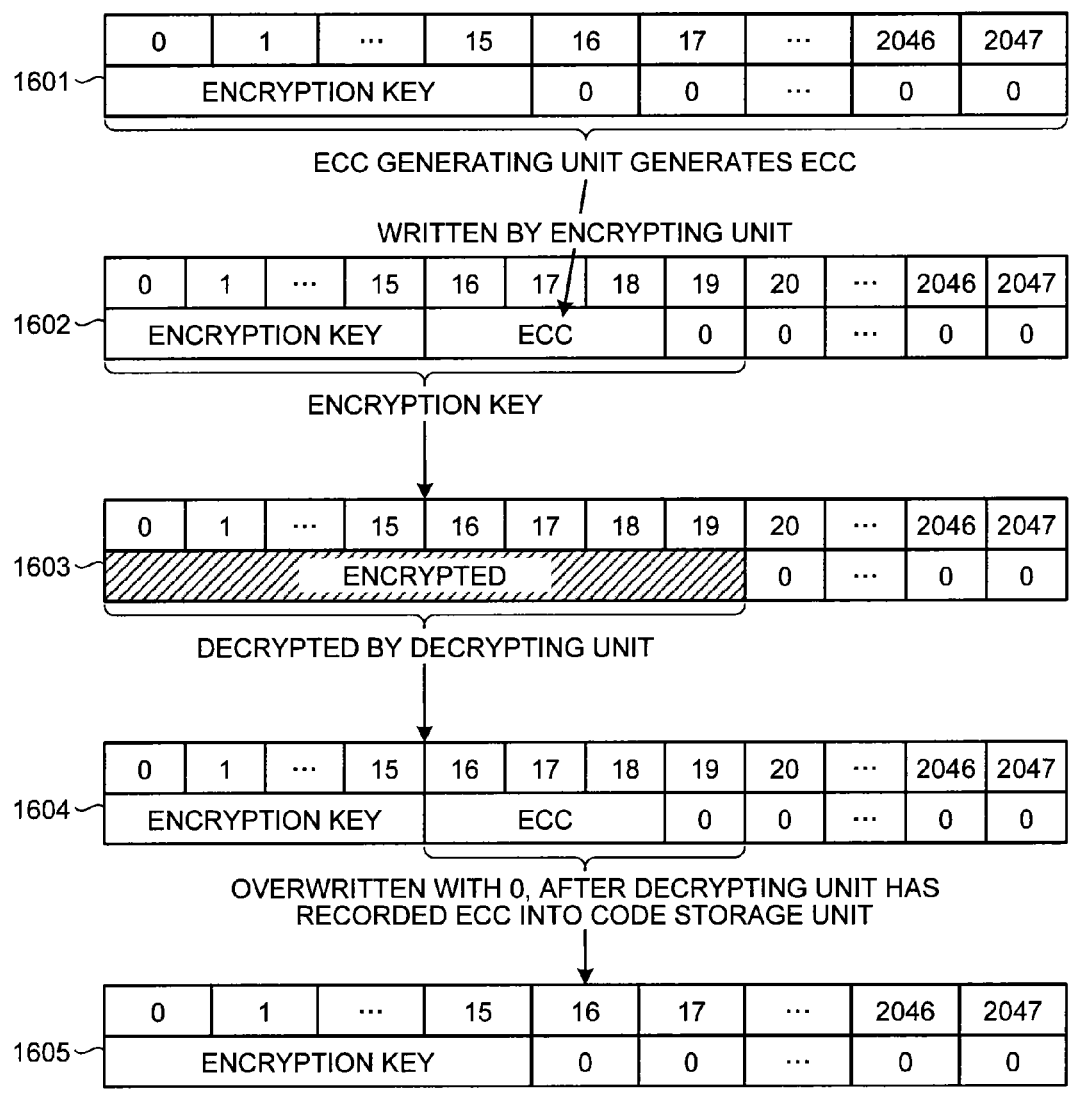
FIG. 16 is a drawing explaining changes in data in a configuration where only minimum data is encrypted and decrypted.

Generally speaking, an encrypting process and a decrypting process that use a public key require a large amount of calculation. Although the size of a page is, for example, approximately 2 kilobytes, the data that is actually written is a small piece of data such as an encryption key (e.g., approximately 16 bytes). Accordingly, to avoid a load from the decrypting process in the semiconductor memory chip 100 in particular, a configuration as explained below, for example, may be used. In other words, an arrangement is acceptable in which only minimum data is encrypted and decrypted. FIG. 16 is a drawing explaining changes in the data with such an arrangement.

First, as an example, let us assume that the size of a page is 2048 bytes, whereas the size of the data to be written is 16 bytes, and the size of the ECC is 3 bytes. Data corresponding to one page that is made up of 16-byte key data at the head and 0's corresponding to the remaining 2032 bytes is input to the ECC generating unit 310 (1601). After recording the 3-byte ECC starting from the 17th byte in the data corresponding to the one page, the encrypting unit 330 encrypts only the 20 bytes at the head (1602). After decrypting only the 20 bytes at the head (1603), the decrypting unit 142 stores, into the code storage unit 111, the 3 bytes starting from the 17th byte in the data corresponding to the one page, as the ECC (1604). Subsequently, after the 3 bytes starting from the 17th byte are overwritten with 0's, the data corresponding to the one page is recorded into the writing special area 113 in the memory 110 (1605).

The writing of the data into the writing special area 113 is always performed via the data converting unit 140 included in the semiconductor memory chip 100. According to the first embodiment, when the data D has been input to the writing device 300, the data D and the ECC of the data D (i.e., ECC (D)) are encrypted by using the public key Kp stored in the writing device 300. Further, the encrypted data D'=Enc(Kp, D) and the encrypted ECC=Enc(Kp, ECC(D)) are input to the data converting unit 140 included in the semiconductor memory chip 100.

In order for the data D to be correctly recorded into the writing special area 113, and also, in order for the ECC(D) to be correctly recorded into the code storage unit 111, the semiconductor memory chip 100 needs to store therein the secret key Ks. In other words, the writing device 300 authenticates the semiconductor memory chip 100. The memory area into which the data is written via the data converting unit 140 in the explanation above corresponds to the writing special area 113.

Next, modification examples of the data converting unit 140, the writing control unit 230, and the writing device 300 shown in FIG. 14 will be explained, with reference to FIG. 17. FIG. 17 is a block diagram of exemplary configurations of a writing device 300-2, a writing control unit 230-2, and a data converting unit 140-2 according to the present modification example.

As shown in FIG. 17, the writing device 300-2 includes an ECC generating unit 310-2, a key storage unit 320-2, an encrypting unit 330-2, the data transmitting unit 340, and a key selecting unit 350. The functions of the data transmitting unit 340 are the same as those shown in FIG. 14. Thus, the same reference characters are assigned thereto, and the explanation thereof will be omitted.

The ECC generating unit 310-2 is different from the ECC generating unit 310 shown in FIG. 14 in that the ECC generated thereby is transmitted to the data transmitting unit 340, instead of to the encrypting unit 330-2.

The key storage unit 320-2 stores therein encryption keys K, which are data conversion keys that use a symmetric key method. According to the present modification example, the key storage unit 320-2 stores therein a plurality of encryption keys K for mutually different versions of the semiconductor memory chip 100, respectively. FIG. 18 is a drawing of an example of a data structure of the data stored in the key storage unit 320-2. As shown in FIG. 18, the key storage unit 320-2 stores therein data in which the versions of the semiconductor memory chip 100 are kept in correspondence with the encryption keys.

Returning to the description of FIG. 17, the key selecting unit 350 selects one of the encryption keys K that matches the version of the semiconductor memory chip 100 out of the key storage unit 320-2. The encrypting unit 330-2 encrypts the data to be written and the ECC by using the selected encryption key K.

Next, an exemplary configuration of the writing control unit 230-2 will be explained. As shown in FIG. 17, the writing control unit 230-2 includes a data transferring unit 231-2. The data transferring unit 231-2 is different from the data transferring unit 231 shown in FIG. 14 in that the data transferring unit 231-2 additionally has a function of transferring the version information that has been read from the semiconductor memory chip 100, in response to a request from the key selecting unit 350.

Next, an exemplary configuration of the data converting unit 140-2 will be explained. As shown in FIG. 17, the data converting unit 140-2 includes a key storage unit 141-2, the decrypting unit 142, the writing unit 143, and a version information storage unit 144. The functions of the data converting unit 140-2, the decrypting unit 142, and the writing unit 143 are the same as those shown in FIG. 14. Thus, the same reference characters are assigned thereto, and the explanation thereof will be omitted.

The version information storage unit 144 stores therein version information of the semiconductor memory chip 100. The key storage unit 141-2 stores therein the encryption keys K that use a symmetric key method. The encryption keys K are encryption keys that correspond to the version information stored in the version information storage unit 144 included in the semiconductor memory chip 100.

Figure 19:
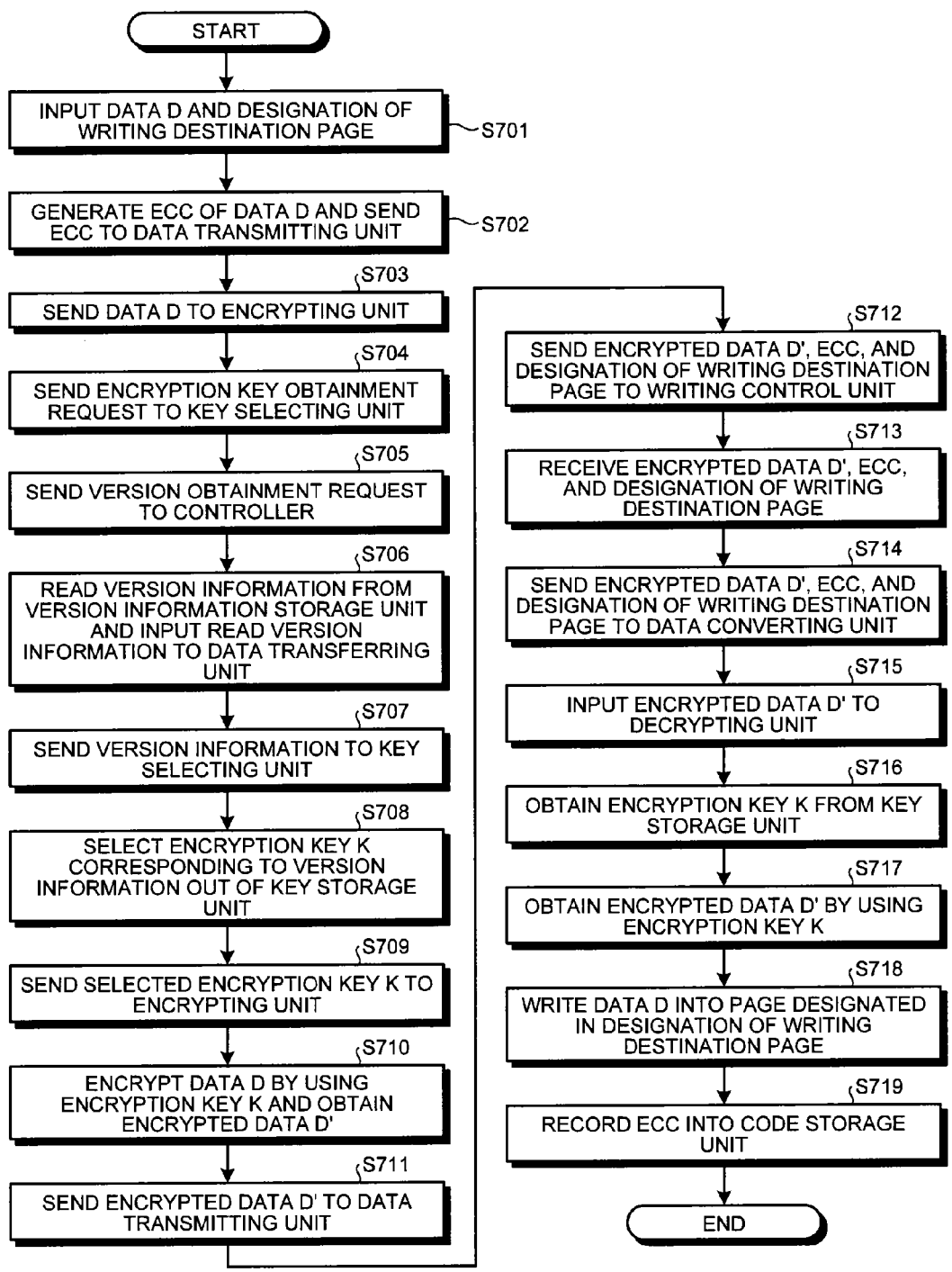
FIG. 19 is a flowchart of an entire flow in a writing process according to a modification example.

Next, a writing process that is performed on the data to be written and is performed by the writing device 300-2, the writing control unit 230-2, and the data converting unit 140-2 that are configured as shown in FIG. 17 will be explained, with reference to FIG. 19. FIG. 19 is a flowchart of an entire flow in the writing process according to the present modification example.

The writing device 300-2 receives an input of the data to be written (i.e., the data D) and a designation of the writing destination page (step S701). The ECC generating unit 310-2 generates an ECC of the data D and transfers the generated ECC to the data transmitting unit 340 (step S702). Also, the ECC generating unit 310-2 transfers the data D to the encrypting unit 330 (step S703). Subsequently, the encrypting unit 330-2 sends an encryption key obtainment request to the key selecting unit 350 (step S704).

According to the first embodiment, the encryption keys are in correspondence with the versions of the semiconductor memory chip 100. If the version is different, the encryption key is different, too. The key storage unit 320-2 included in the writing device 300 stores therein the encryption keys that are respectively in correspondence with the versions of the semiconductor memory chip 100. If the version of the semiconductor memory chip is unknown, it is not possible to obtain the corresponding encryption key.

For this reason, when the key selecting unit 350 has received the encryption key obtainment request from the encrypting unit 330-2, the key selecting unit 350 sends a version obtainment request to the controller 200 (step S705). The controller 200 reads the version information of the semiconductor memory chip 100 from the version information storage unit 144 included in the data converting unit 140 in the semiconductor memory chip 100 and inputs the read version information to the data transferring unit 231 (step S706). The data transferring unit 231 transmits the version information to the key selecting unit 350 included in the writing device 300 (step S707). The key selecting unit 350 selects an encryption key K that corresponds to the received version information out of the key storage unit 320-2 (step S708). After that, the key selecting unit 350 transmits the selected encryption key K to the encrypting unit 330-2 (step S709).

The encrypting unit 330-2 encrypts the data to be written (i.e., the data D) by using the transmitted encryption key K and obtains encrypted data D' (step S710). The encrypting unit 330-2 sends the encrypted data D' to the data transmitting unit 340 (step S711). The data transmitting unit 340 transmits the encrypted data D', the designation of the writing destination page, and the ECC to the writing control unit 230-2 included in the controller 200 (step S712). The data transferring unit 231-2 included in the writing control unit 230-2 receives the encrypted data D', the designation of the writing destination page, and the ECC (step S713) and transmits these pieces of information to the data converting unit 140-2 included in the semiconductor memory chip 100 (step S714).

The data converting unit 140-2 inputs the received encrypted data D' to the decrypting unit 142 (step S715). The decrypting unit 142 obtains the encryption key K from the key storage unit 141-2 (step S716). The decrypting unit 142 decrypts the encrypted data D' so as to obtain the data D, by using the encryption key K (step S717). The writing unit 143 records the data D resulting from the decrypting process into the page in the memory 110 that has been designated by the designation of the writing destination page (step S718). Also, the writing unit 143 stores the received ECC into the code storage unit 111, as the ECC that corresponds to the designated page (step S719).

The process to record the data into the memory area via the data converting unit 140-2 shown in FIG. 17 is always subject to the converting process performed by the data converting unit 140-2. The area into which the data is recorded via the data converting unit 140-2 corresponds to the writing special area 113.

When the data D has been input to the writing device 300, the data D is encrypted by using the encryption key K that has been selected in correspondence with the version of the semiconductor memory chip 100. Further, the encrypted data D'=Enc(K, D) is input to the data converting unit 140-2 included in the semiconductor memory chip 100. In order for the data D to be correctly recorded into the writing special area 113, the semiconductor memory chip 100 needs to store therein the encryption key K. In other words, in this situation also, the writing device 300 authenticates the semiconductor memory chip 100.

The reading special area is used for the semiconductor memory chip 100's authenticating the controller 200. In contrast, the writing special area is used for the writing device 300's authenticating the semiconductor memory chip 100. Let us discuss the trust chain shown in FIG. 1 again. To structure the trust chain starting from the writing device 300 to the semiconductor memory chip 100, and to the controller 200, it is necessary that the reading special area and the writing special area have an overlapping area. In other words, if the controller 200 is able to read the data correctly (i.e., in the manner intended by the writing device 300) that has been recorded in the overlapping area (i.e., the common area), it means that the trust chain is completed. Hereinafter, the overlapping area (i.e., the common area) between the reading special area and the writing special area may simply be referred to as a special area.

In the example shown in FIG. 18, the version information is simply a numerical value; however, the version information is not limited to this example. Further, another arrangement is acceptable in which a corresponding encryption key is selected out of a plurality of encryption keys, according to the version information and one or more pieces of information other than the version information. For example, it is acceptable to determine the version information based on the time period in which the semiconductor memory chip 100 was manufactured or a lot number used during the manufacture.

Further, the version information does not necessarily have to be a numerical value. For example, the version information may be a character string or a sequence that is made up of one or more numerical values and one or more character strings. FIG. 20 is a drawing of a modification example of the version information that has such a structure. In FIG. 20, an example is shown in which a sequence that is made up of the name of the manufacturing factory of the semiconductor memory chip 100, the lot number managed in the manufacturing factory, and the client number is used as the version information. In this situation, the client number is, for example, a number that is assigned to a large-scale customer by the manufacturer of the semiconductor memory chip 100. As for products that are not for large-scale customers, the numerical value expressing the client number may be a fixed value (e.g., 0). The correspondence table as shown in FIG. 20 is stored in the key storage unit 320-2 included in the writing device 300.

As explained above, the semiconductor memory chip according to the first embodiment includes the encryption key sharing unit and the sending control unit that are provided on the same die as the one on which the memory is provided and that function as an authenticating unit to authenticate the controller. Further, only the controller that has been authenticated is able to correctly read the data stored in the memory. In addition, the semiconductor memory chip includes the key storage unit that is provided on the same die as the one on which the memory is provided and that stores therein the predetermined encryption key as well as the data converting unit that decrypts the data by using the encryption key and that stores the decrypted data into the memory. Unless the correct encryption key is stored, it is not possible to correctly record the data. With this arrangement, it is possible to prevent illegitimate use of the data that is realized by, for example, counterfeiting memory cards.

According to the first embodiment, the data to be written is decrypted before the data is written into the writing special area. In contrast, a semiconductor memory chip according to a second embodiment decrypts data that has been read from the writing special area (i.e., the encrypted written data). In this situation also, in order for the data that has been read from the writing special area to be correctly decrypted, the semiconductor memory chip needs to store therein the encryption key that corresponds to the encryption key used by the writing device in the encrypting process. In other words, in this situation also, the writing device authenticates the semiconductor memory chip.

Figure 21:
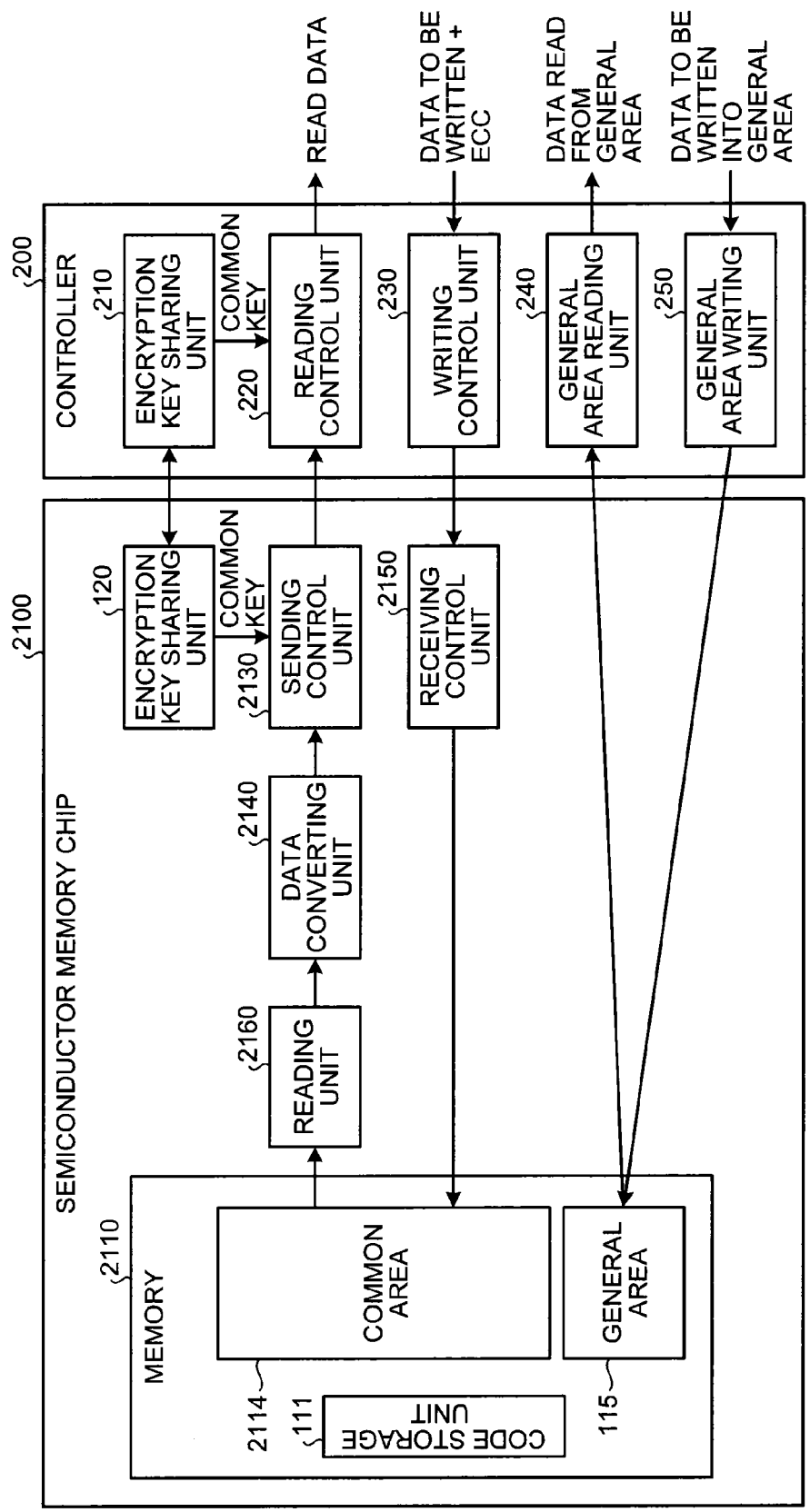
FIG. 21 is a block diagram of a semiconductor memory chip according to a second embodiment.

FIG. 21 is a block diagram of an example of a configuration of a semiconductor memory chip 2100 according to the second embodiment. The controller 200 has the same configuration as in the first embodiment. As shown in FIG. 21, the semiconductor memory chip 2100 includes a memory 2110, the encryption key sharing unit 120, a sending control unit 2130, a data converting unit 2140, a receiving control unit 2150, and a reading unit 2160.

One of the differences from the first embodiment is the position in which the data converting unit 140 is provided. As shown in FIG. 2, according to the first embodiment, the data converting process (i.e., the decrypting process) is performed with a data writing process. In contrast, according to the second embodiment, the data converting process (i.e., the decrypting process) is performed with a data reading process. Further, the second embodiment is different from the first embodiment with respect to the configurations of the memory 2110 and the sending control unit 2130, and also, in that the receiving control unit 2150 and the reading unit 2160 are additionally provided. Other configurations and functions are the same as those shown in FIG. 2, which is a block diagram of the semiconductor memory chip 100 according to the first embodiment. Thus, the same reference characters are assigned thereto, and the explanation thereof will be omitted.

The sending control unit 2130 is different from the sending control unit 130 shown in FIG. 5 in that the reading unit 132 is eliminated therefrom. The sending control unit 2130 receives, as an input, the data that has been read by the reading unit 2160 and converted by the data converting unit 140, instead of receiving the data that has been read by the reading unit 132 as an input.

The memory 2110 includes the code storage unit 111, a common area 2114, and the general area 115. According to the second embodiment, the writing special area is a predetermined memory area within the memory area into which the data that is decrypted by the data converting unit 2140 is written during a data reading process. According to the second embodiment, during the data reading process, the data that has been decrypted by the data converting unit 2140 is input to the sending control unit 2130, so that the controller 200 can be authenticated. Accordingly, the writing special area into which the data to be decrypted by the data converting unit 2140 is written coincides with the reading special area from which only the authenticated controller 200 is able to correctly read the data. Thus, only the common area 2114 is shown in the memory 2110 in the example in FIG. 21.

The receiving control unit 2150 controls a process of receiving encrypted data obtained by encrypting the data to be written and writing the encrypted data into the common area 2114 without decrypting the encrypted data.

The reading unit 2160 reads the data in the page that has been designated as a reading target page from the reading special area (i.e., the common area 2114) and transmits the read data to the data converting unit 2140. Further, the reading unit 2160 reads the ECC that corresponds to the data in the designated page from the code storage unit 111 and transmits the ECC to the sending control unit 2130.

Figure 22:
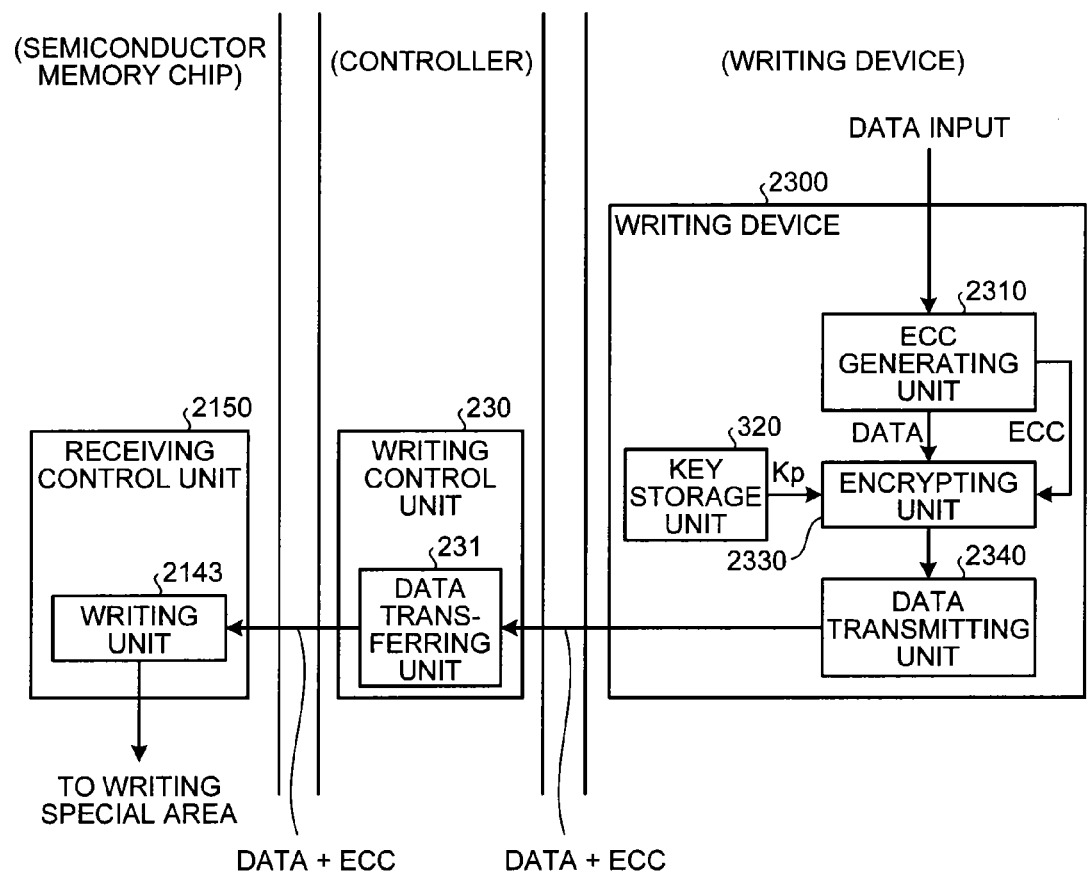
FIG. 22 is a diagram of exemplary configurations of a receiving control unit and a writing device according to the second embodiment.

Next, an exemplary configuration of the receiving control unit 2150 shown in FIG. 21 and an exemplary configuration of a writing device 2300 according to the second embodiment will be explained, with reference to FIG. 22. It should be noted that only the part that is related to the writing process is shown in FIG. 22.

First, a configuration of the writing device 2300 will be explained. As shown in FIG. 22, the writing device 2300 includes an ECC generating unit 2310, the key storage unit 320, an encrypting unit 2330, and a data transmitting unit 2340. The key storage unit 320 has the same configuration as the key storage unit 320 shown in FIG. 14. Thus, the same reference character is assigned thereto, and the explanation thereof will be omitted.

The ECC generating unit 2310 generates an ECC of the data to be written that has been input as the data that needs to be written. The encrypting unit 2330 encrypts the data to be written by using the public key Kp. The data transmitting unit 2340 transmits the encrypted data, the ECC, and a designation of the writing destination page to the writing control unit 230 included in the controller 200.

Next, a configuration of the receiving control unit 2150 will be explained. As shown in FIG. 22, the receiving control unit 2150 includes a writing unit 2143. The writing unit 2143 records the encrypted data into the designated page in the common area 2114. Also, the writing unit 2143 stores the ECC into the code storage unit 111.

Figure 23:
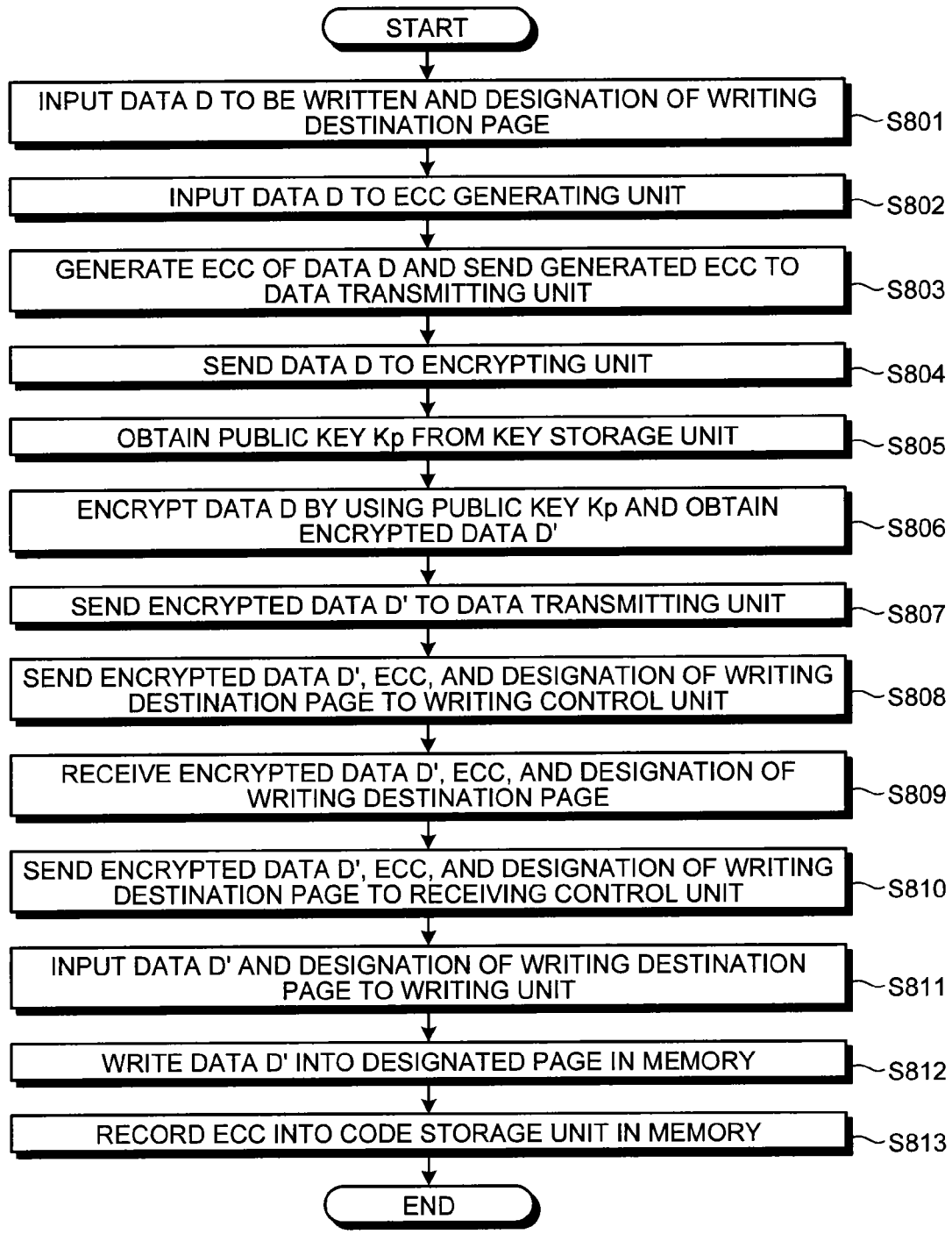
FIG. 23 is a flowchart of an entire flow in a writing process according to the second embodiment.

Next, a writing process that is performed on the data to be written and is performed by the writing device 2300, the writing control unit 230, and the receiving control unit 2150 that are configured as shown in FIG. 22 will be explained, with reference to FIG. 23. FIG. 23 is a flowchart of an entire flow in the writing process according to the second embodiment.

The writing device 2300 receives an input of the data to be written (i.e., the data D) and a designation of the writing destination page (step S801). The writing device 2300 inputs the input data D to the ECC generating unit 2310 (step S802). After that, the ECC generating unit 2310 generates an ECC of the data D and transfers the generated ECC to the data transmitting unit 2340 (step S803). Also, the ECC generating unit 2310 transfers the data D to the encrypting unit 2330 (step S804).

The encrypting unit 2330 obtains the public key Kp from the key storage unit 320 (step S805). Further, the encrypting unit 2330 encrypts the data D by using the obtained public key Kp so as to obtain encrypted data D' (step S806). Subsequently, the encrypting unit 2330 sends the encrypted data D' to the data transmitting unit 2340 (step S807). The data transmitting unit 340 transmits the encrypted data D', the designation of the writing destination page, and the ECC to the writing control unit 230 included in the controller 200 (step S808).

The data transferring unit 231 included in the writing control unit 230 receives the encrypted data D', the designation of the writing destination page, and the ECC (step S809) and transmits these pieces of information to the receiving control unit 2150 included in the semiconductor memory chip 100 (step S810).

The receiving control unit 2150 inputs the encrypted data D' and the designation of the writing destination page to the writing unit 2143 (step S811). The writing unit 2143 records the input encrypted data D' to the page in the memory 110 that has been designated by the designation of the writing destination page (step S812). Further, the receiving control unit 2150 stores the ECC into the code storage unit 111, as the ECC that corresponds to the designated page (step S813).

As explained above, according to the second embodiment, when the data D has been input to the writing device 2300, the data D is encrypted by using the public key Kp stored in the writing device 2300. Further, the encrypted data D'=Enc(Kp, D) and the ECC(D) related to the data D are input to the receiving control unit 2150 included in the semiconductor memory chip 100. As a result, the data Enc(Kp, D) is recorded in the writing special area (i.e., the common area 2114), whereas the ECC(D) is recorded in the code storage unit 111.

Figure 24:
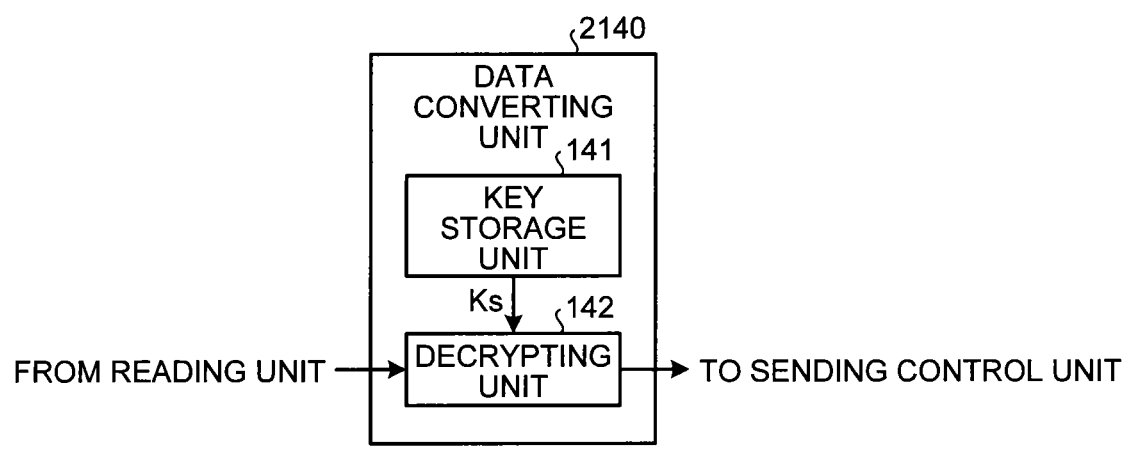
FIG. 24 is a diagram of an exemplary configuration of a data converting unit according to the second embodiment.

Next, an exemplary configuration of the data converting unit 2140 shown in FIG. 21 will be explained, with reference to FIG. 24. As shown in FIG. 24, the data converting unit 2140 includes the key storage unit 141 and a decrypting unit 2142. The configuration and the function of the key storage unit 141 are the same as those shown in FIG. 14. Thus, the same reference characters are assigned thereto, and the explanation thereof will be omitted. The decrypting unit 2142 decrypts the data that has been read by the reading unit 2160 by using the secret key Ks stored in the key storage unit 141.

Figure 25:
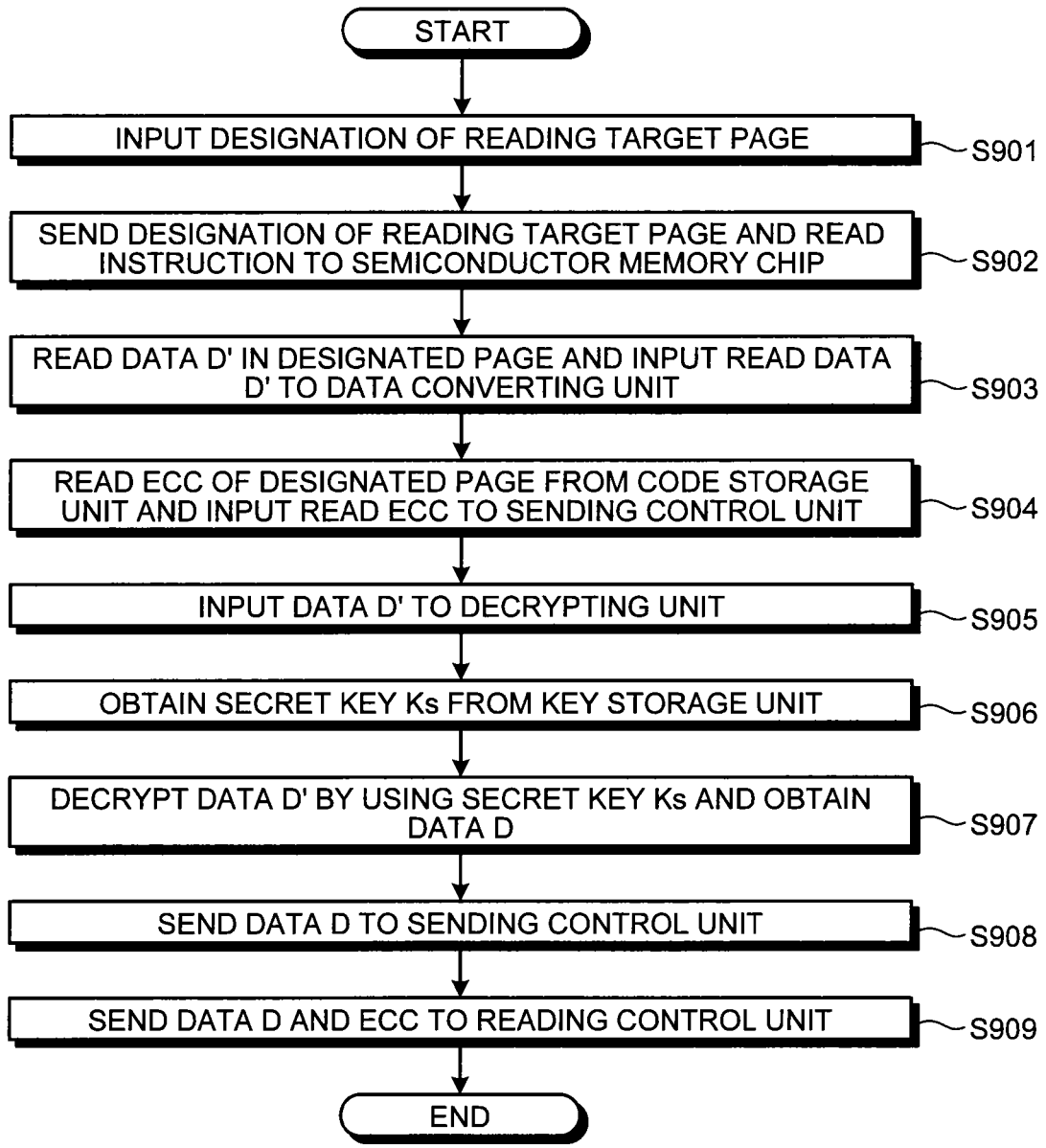
FIG. 25 is a flowchart of an entire flow in a data reading process according to the second embodiment.

Subsequently, a data reading process that is performed by the data converting unit 2140 configured as shown in FIG. 24 will be explained, with reference to FIG. 25. FIG. 25 is a flowchart of an entire flow in the data reading process according to the second embodiment.

First, the controller 200 receives, as an input, a designation of a reading target page from an external device such as a playback device (step S901). The reading control unit 220 included in the controller 200 sends a read instruction indicating that data should be read from the designated reading target page in the memory 110 to the semiconductor memory chip 100 (step S902). The reading unit 2160 included in the semiconductor memory chip 100 reads the data in the designated reading target page and inputs the read data to the data converting unit 2140 (step S903). Also, the reading unit 2160 reads the ECC that corresponds to the designated reading target page from the code storage unit 111 and sends the ECC to the sending control unit 2130 (step S904).

As explained above, according to the second embodiment, the encrypted data is written into the common area 2114 without being decrypted. Thus, the data that has been read is encrypted. In the following sections, the data that has been read will be referred to as the "data D'".

The data converting unit 2140 inputs the input data D' to the decrypting unit 2142 (step S905). The decrypting unit 2142 obtains the secret key Ks from the key storage unit 141 (step S906). The decrypting unit 2142 decrypts the input data D' by using the obtained secret key Ks and obtains the data D (step S907). After that, the decrypting unit 2142 sends the data D resulting from the decrypting process to the sending control unit 2130 (step S908).

The sending control unit 2130 sends the data D that has been decrypted and received from the data converting unit 2140 and the ECC that has been read from the code storage unit 111 to the reading control unit 220 included in the controller 200 (step S909). The process performed thereafter is the same as the process performed at step S212 and thereafter shown in FIG. 6. Thus, the process is omitted from FIG. 25.

According to the second embodiment, the reading of the data from the writing special area (i.e., the common area 2114) is always performed via the data converting unit 2140 included in the semiconductor memory chip 100. Let us assume that, as a result of the writing process described above, the data in the reading target page in the writing special area (i.e., the common area 2114) is Enc(Kp, D), whereas the ECC(D) has been recorded in the code storage unit 111 as the ECC of the page. In that situation, the data that is sent from the data converting unit 2140 included in the semiconductor memory chip 100 to the sending control unit 2130 is Dec(Ks, Enc(Kp, D))=D. Further, the controller 200 receives the data D and the ECC(D). In this situation, Dec(A, B) signifies that data B is decrypted by a key A used in the decrypting process.

In the situation where the writing device 300 has written Enc(Kp, D) and the ECC(D) as described above, in order for the controller 200 to correctly receive the intended data D and the corresponding ECC(D), the semiconductor memory chip 100 needs to store therein the secret key Ks. In other words, in this situation also, the writing device 300 authenticates the semiconductor memory chip 100. The memory area from which the data is read via the data converting unit 2140 corresponds to the writing special area according to the third embodiment.

As explained above, the memory chip according to the second embodiment includes the key storage unit that is provided on the same die as the one on which the memory is provided and that stores therein the predetermined encryption key as well as the data converting unit that decrypts the data that has been read from the memory by using the encryption key. Further, unless the correct encryption key is stored, it is not possible to correctly reconstruct the data that has been written. With this arrangement, it is possible to prevent illegitimate use of the data that is realized by, for example, counterfeiting memory cards.

As explained in the description of the first and the second embodiments, when the writing device has written data into the special area (i.e., the common area), and also, the controller has read the data from the special data, the trust chain is structured. The judgment of whether the controller is able to correctly read the data that has been written into the special area by the writing device is actually made by judging whether it is possible to properly utilize the data (e.g., to play back the contents).

As a third embodiment, an embodiment related to a specific data utilization will be explained, including a device (e.g., a player) that utilizes the data stored in the semiconductor memory chip according to the embodiments described above.

Figure 26:
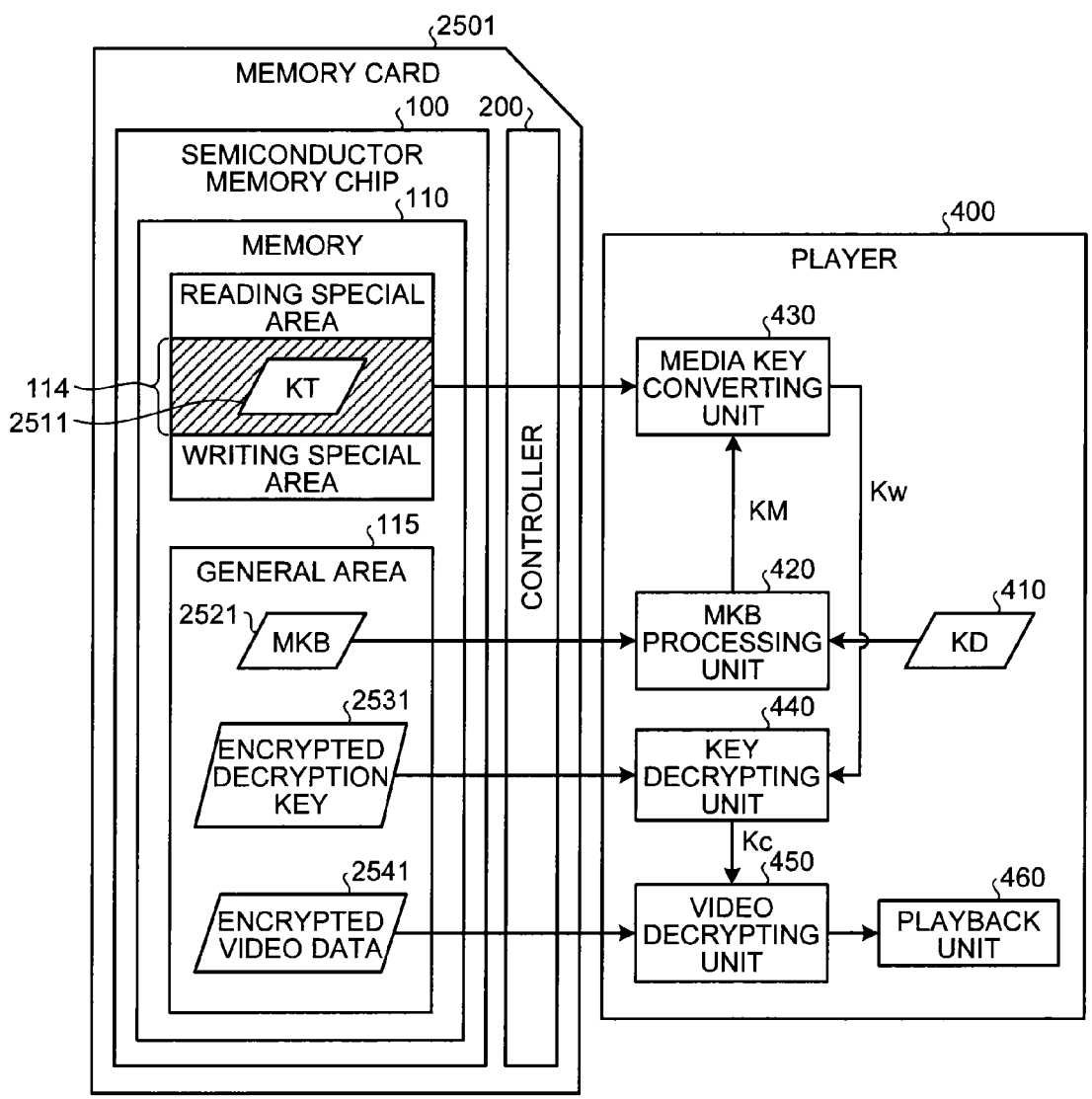
FIG. 26 is a block diagram of a player and a memory card according to a third embodiment.

FIG. 26 is a block diagram of examples of configurations of a player 400 that is a device that utilizes the data and a memory card 2501 from which the data is read by the player 400 according to the third embodiment.

As shown in FIG. 26, the memory card 2501 includes the semiconductor memory chip 100 and the controller 200. The semiconductor memory chip 100 and the controller 200 have the same configurations as those described in the first embodiment or the second embodiment. For example, the controller 200 shown in FIG. 26 includes the encryption key sharing unit 210 shown in FIG. 3 and the reading control unit 220 shown in FIG. 5. The memory card 2501 may be configured with, for example, an SD memory card.

According to the third embodiment, encrypted video data 2541, an encrypted decryption key 2531 obtained by encrypting a decryption key Kc used for decrypting the encrypted video data 2541, and an MKB 2521 (hereinafter, simply referred to as the "MKB") have been recorded into the general area 115 in the memory 110 included in the semiconductor memory chip 100. Further, a media key conversion key 2511 (hereinafter, the "media key conversion key KT") is stored in the special area (i.e., the common area 114) within the memory 110.

The decryption key Kc is recorded as the encrypted decryption key 2531 that has been encrypted. The key used in this encrypting process is obtained by converting the media key KM that is derived when the MKB has correctly been processed, while using the media key conversion key KT. For example, the encrypted decryption key 2531=AES-E(AES-G(KT, KM), Kc) is satisfied. In the present example, a one-way function AES-G is used in the converting process, whereas AES-E is used in the encrypting process.

The player 400 stores therein a KD 410 (hereinafter, the "device key KD") denoting a device key and also includes an MKB processing unit 420, a media key converting unit 430, a key decrypting unit 440, a video decrypting unit 450, and a playback unit 460.

The MKB processing unit 420 performs MKB processing to derive the media key KM by processing the MKB that has been read from the general area 115 while using the device key KD. The media key converting unit 430 generates a key Kw by converting the derived media key KM while using the media key conversion key KT that has been read from the special area. The key decrypting unit 440 generates the decryption key Kc by decrypting the encrypted decryption key 2531 that has been read from the general area 115, while using the key Kw. The video decrypting unit 450 decrypts the encrypted video data by using the decryption key Kc. The playback unit 460 plays back the decrypted video data.

Figure 27:
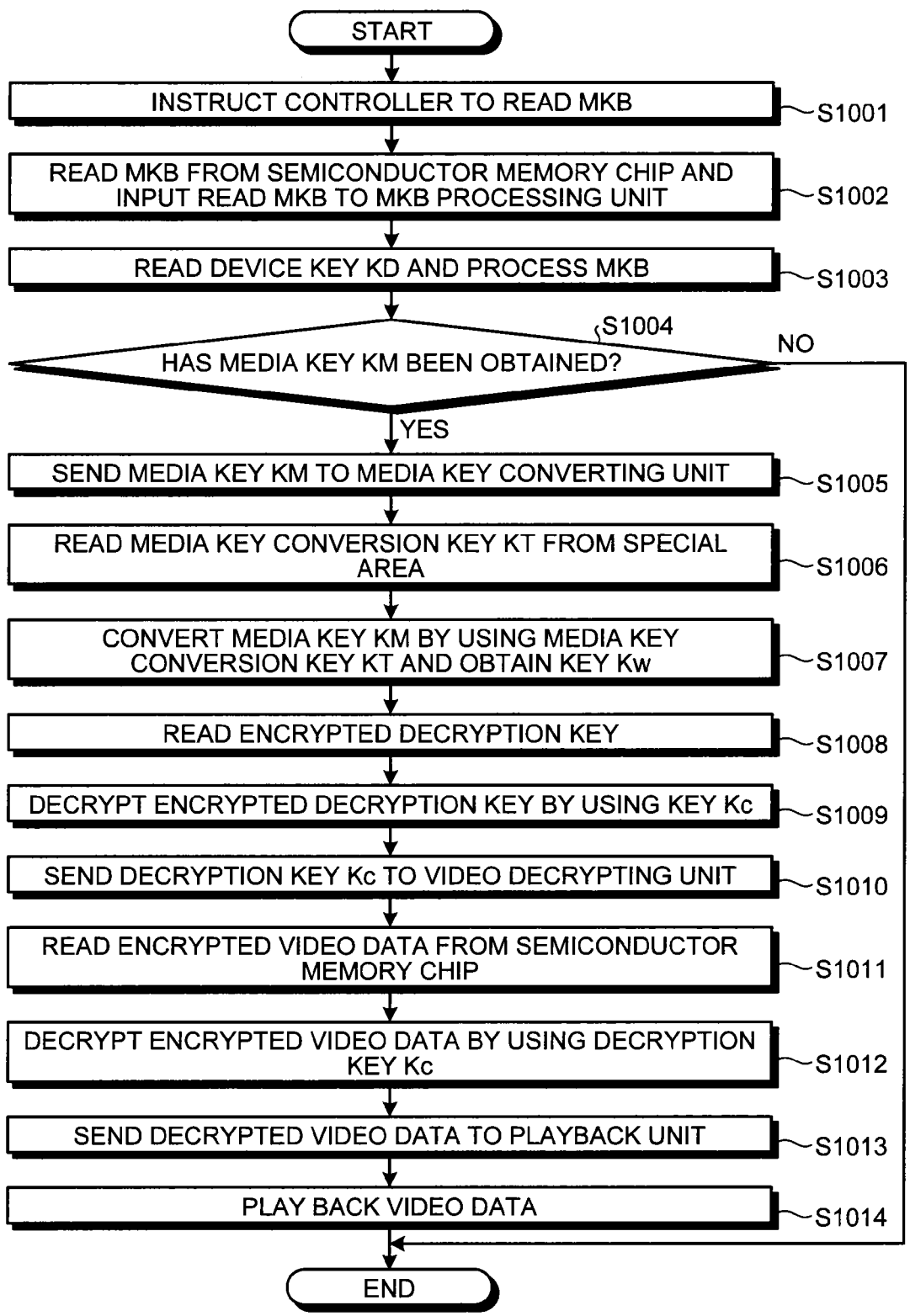
FIG. 27 is a flowchart of an entire flow in a playback process according to the third embodiment.

Next, a data playback process that is performed in the memory card 2501 by the player 400 configured as shown in FIG. 26 will be explained, with reference to FIG. 27. FIG. 27 is a flowchart of an entire flow in the playback process according to the third embodiment.

The player 400 instructs the controller 200 included in the memory card 2501 to read the MKB contained in the general area 115 (step S1001). For example, the player 400 provides the controller 200 with a designation of the head address and the size of the MKB.

The controller 200 reads the page that includes the designated area from the semiconductor memory chip 100 and sends the data (i.e., the value of the MKB) in the designated area to the player 400. The player 400 inputs the received MKB to the MKB processing unit 420 (step S1002). The MKB processing unit 420 reads the device key KD stored in the player 400, performs the MKB processing on the input MKB by using the device key KD, and derives and outputs the media key KM (step S1003).

After that, the MKB processing unit 420 judges whether the media key KM has been obtained as a result of the MKB processing (step S1004). In the case where the device key KD has been revoked by the MKB, the MKB processing unit 420 is not able to derive the correct media key KM. In that situation, the MKB processing unit 420 judges that the media key KM has not been obtained (step S1004: No) and outputs an error message. In the case where the error message has been output by the MKB processing unit 420, the player 400 displays an alert message and stops the operation.

In the case where the media key KM has been obtained (step S1004: Yes), the player 400 sends the media key KM to the media key converting unit 430 (step S1005). After that, the player 400 instructs that the media key conversion key KT contained in the special area (i.e., the common area 114) should be read (step S1006). For example, the player 400 provides the controller 200 with a designation of the head address and the size of the media key conversion key KT.

The controller 200 reads the page that includes the designated area from the semiconductor memory chip 100 and sends the data (i.e., the value of the media key conversion key KT) in the designated area to the player 400. The player 400 inputs the value of the media key conversion key KT that has been received from the controller 200 to the media key converting unit 430.

The media key converting unit 430 converts the media key KM by using the input media key conversion key KT and obtains the key Kw=AES-G(KT, KM) (step S1007). The player 400 sends the value of the key Kw to the key decrypting unit 440.

After that, the player 400 reads the encrypted decryption key 2531 from the general area 115 in the semiconductor memory chip 100, via the controller 200 (step S1008). For example, the player 400 provides the controller 200 with a designation of the head address and the size of the encrypted decryption key 2531.

The controller 200 reads the page that includes the designated area from the general area 115 and sends the data (i.e., the value of the encrypted decryption key 2531) in the designated area to the player 400. The player 400 inputs the value of the encrypted decryption key 2531 that has been received from the controller 200 to the key decrypting unit 440.

The key decrypting unit 440 decrypts the input encrypted decryption key 2531 by using the key Kw (step S1009). As a result, the value of the decryption key Kc is obtained. The formula to obtain the decryption key Kc can be expressed as shown in Expression (1) below.

$$Dec(Kw, \text{encrypted decryption key}) = \\ Dec(Kw, Enc(AES\text{-}G(KT, KM), Kc)) = \\ Dec(Kw, Enc(Kw, Kc)) = Kc \quad (1)$$

The key decrypting unit 440 sends the value of the decryption key Kc to the video decrypting unit 450 (step S1010). The video decrypting unit 450 stores therein the value of the decryption key Kc that has been received.

After that, the player 400 sequentially reads the pieces of encrypted video data from the general area 115 via the controller 200 and sequentially inputs the read pieces of encrypted video data to the video decrypting unit 450 (step S1011). The video decrypting unit 450 sequentially decrypts the pieces of encrypted video data by using the decryption key Kc (step S1012) and sends the decrypted pieces of video data to the playback unit 460 (step S1013). The playback unit 460 sequentially plays back (displays) the received pieces of video data (step S1014).

The media key conversion key KT is data that is necessary for obtaining the correct content decryption key (i.e., the decryption key Kc). For example, the value of the media key conversion key KT may be different for each semiconductor memory chip 100. Alternatively, the value of the media key conversion key KT may be different for each memory card 2501. Further, the value of the media key conversion key KT may be statistically different for each memory card 2501. To be "statistically different" means that there is a possibility that the value may not be different in a strict sense, but the value is considered to be different based on statistics. For example, in the situation where a random number having an extremely large number of digits has been generated and the value of the random number is being used, the value is considered to be statistically different.

In the case where the media key conversion key KT recorded in the special area is (at least statistically) different for each memory card 2501, it is possible to consider the media key conversion key KT to be a type of ID of the memory card 2501. Another arrangement is acceptable in which, instead of the media key conversion key KT, the MKB is stored as the data that is necessary for decrypting the encrypted content data (e.g., the video data).

To correctly record the media key conversion key KT into the writing special area in the semiconductor memory chip 100, the semiconductor memory chip 100 needs to be authenticated by the writing device 300. In order for the player 400 to be able to correctly read, via the controller 200, the media key conversion key KT that has been recorded in the reading special area, the controller 200 needs to be authenticated by the semiconductor memory chip 100. To summarize, unless the trust chain in which the writing device 300 authenticates the controller 200 via the semiconductor memory chip 100 has been established, the player 400 is not able to correctly read the media key conversion key KT. In other words, the player 400's being able to play back the video is assumed to be a proof that the trust chain has been established.

An arrangement is acceptable in which the MKB according to the third embodiment is supplied by the video supplier for each of the videos. Generally speaking, MKBs are configured by using a symmetric key encrypting method. In the situation where the MKB is supplied by the video supplier for each of the videos, it is desirable to configure the MKB by using a public key encrypting method. The reason for this will be explained in the following sections.

In the case where an MKB is configured by using a symmetric key encrypting method, it is necessary to know, generally speaking, all the values of the device keys to generate the MKB. To allow the video supplier to generate the MKB, it is necessary to provide the video supplier with all the values of the device keys KD. If the values of the device keys KD have been leaked to a malicious player manufacturer, revocation of players by using the MKB is substantially meaningless. The reason is that, even if vicious or inferior players have been revoked by using the MKB, the malicious player manufacturer is able to keep manufacturing as many vicious or inferior players as desired by using the device keys KD that have not been revoked.

For this reason, there is an advantage in configuring the MKB by using a public key encrypting method. In the case where a public key encrypting method is used, the device key KD is configured by using a secret key. Each of the player manufacturers knows only the value of the device key KD that has been assigned to the player manufacturer. In contrast, a public key is distributed to the video supplier for the purpose of generating the MKB. The video supplier is able to freely generate the MKB by using the public key. Even if the public key used for generating the MKB has been leaked to a malicious player manufacturer, the malicious player manufacturer is not able to learn the value of the device key KD that is configured by using a secret key, because of the basic characteristics of the public key encrypting method. For this reason, the MKB shown in FIG. 26 may be an MKB that is configured based on a public key encrypting method.

As explained above, according to the third embodiment, the encrypted data is stored in the general area, whereas the data that is necessary for decrypting the encrypted data is stored in the special area, so that it is possible to decrypt and utilize the encrypted data by using the data stored in the special area. With this arrangement, it is possible to realize the situation in which the content suppliers are able to revoke the playback devices.

As a fourth embodiment, an example will be explained in which revocation of a controller by using an MKB associated with a content is combined with individualization of encrypted video data for each memory card.

Figure 28:
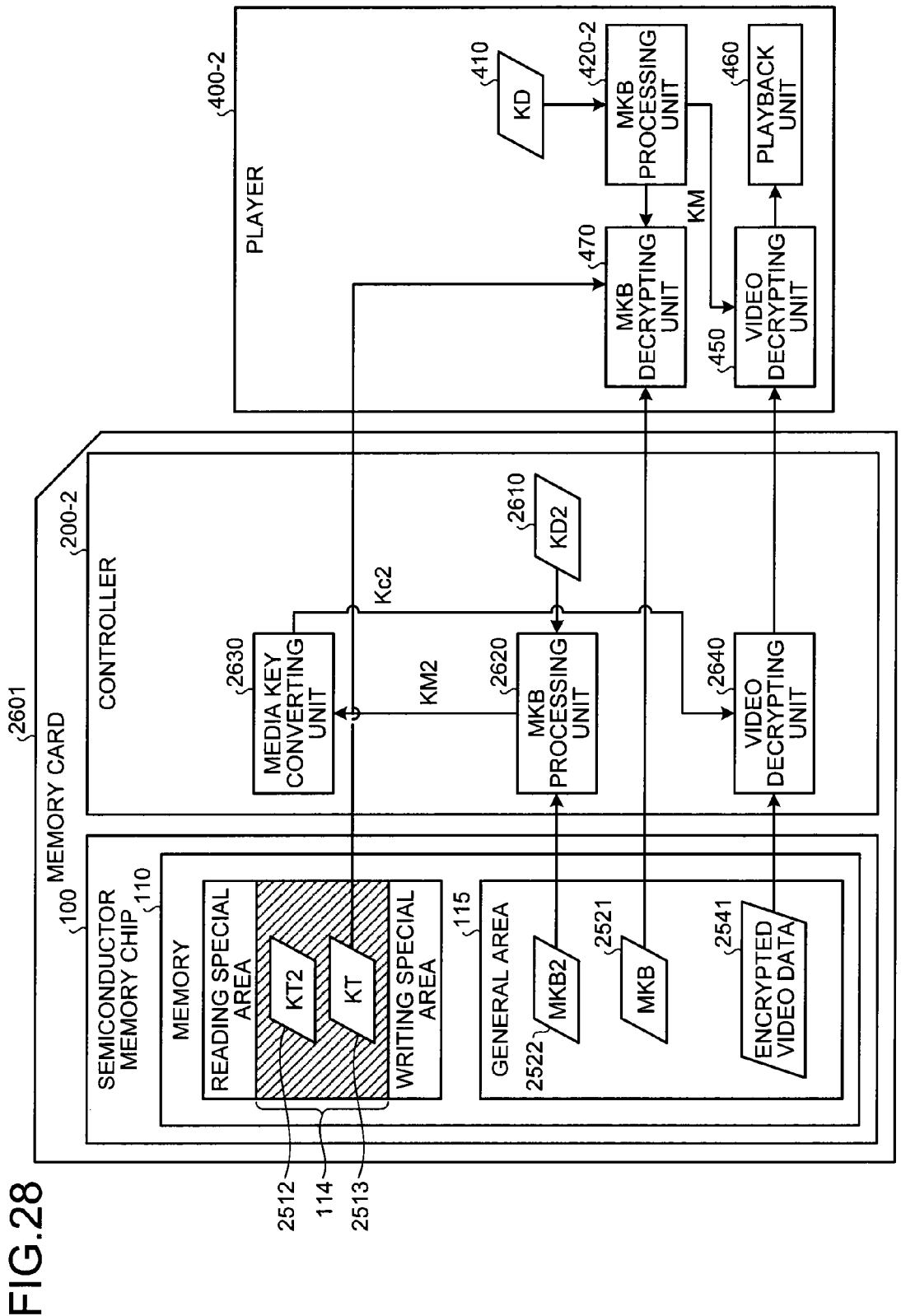
FIG. 28 is a block diagram of a player and a memory card according to a fourth embodiment.

FIG. 28 is a block diagram of an example of configurations of a player 400-2 and a memory card 2601 according to the fourth embodiment.

As shown in FIG. 28, the memory card 2601 includes the semiconductor memory chip 100 and a controller 200-2. The semiconductor memory chip 100 has the same configuration as in the first embodiment or the second embodiment.

According to the fourth embodiment, the encrypted video data 2541, encrypted MKB 2521-2 (hereinafter, the "MKB'"), and an MKB 2522 (hereinafter, the "MKB2") have been recorded in the general area 115. Also, an MKB decryption key 2513 (hereinafter, the "MKB decryption key KT") used for obtaining the MKB by decrypting the MKB', as well as a media key conversion key 2512 (hereinafter, the "media key conversion key KT2") are stored in the special area (i.e., the common area 114). As explained here, according to the fourth embodiment, instead of the media key conversion key 2511 (i.e., the media key conversion key KT), the MKB decryption key KT used for obtaining the MKB through the decrypting process is provided.

Next, an exemplary configuration of the controller 200-2 will be explained. In addition to the configuration of the controller 200 according to the first embodiment or the second embodiment, the controller 200-2 according to the fifth embodiment includes a device key KD 2610 (hereinafter, the "device key KD2"), an MKB processing unit 2620, a media key converting unit 2630, and a video decrypting unit 2640. The constituent elements that are explained in the first embodiment or the second embodiment are omitted from FIG. 28. It should be noted, however, that the controller 200-2 includes, for example, the encryption key sharing unit 210-2 shown in FIG. 7 and the reading control unit 220-3 shown in FIG. 11. Further, the reading process to read the MKB decryption key KT and the media key conversion key KT2 that are stored in the reading special area is performed by using the encryption key sharing unit 210-2 and the reading control unit 220-3.

The MKB processing unit 2620 performs MKB processing to derive the media key KM2 by processing, while using the device key KD2, the MKB2 that has been read from the general area 115. The media key converting unit 2630 generates a decryption key Kc2 by converting the derived media key KM2 while using the media key conversion key KT2 that has been read from the special area. The video decrypting unit 2640 decrypts the encrypted video data by using the decryption key Kc2.

Next, an exemplary configuration of the player 400-2 will be explained. The player 400-2 stores therein a device key 410 (hereinafter, the "device key KD") and includes an MKB processing unit 420-2, the video decrypting unit 450, the playback unit 460, and an MKB decrypting unit 470.

The player 400-2 according to the fourth embodiment is different from the player 400 according to the third embodiment in that the MKB decrypting unit 470 is additionally provided, that the MKB processing unit 420-2 has different functions, and that the key decrypting unit 440 and the media key converting unit 430 are eliminated.

The MKB decrypting unit 470 generates the MKB by decrypting the MKB' that has been read from the general area 115 while using the MKB decryption key KT. The MKB processing unit 420-2 performs MKB processing to derive the media key KM by processing the generated MKB while using the device key KD.

As explained above, according to the fourth embodiment, the two MKBs (i.e., the MKB' obtained by encrypting the MKB and the MKB2) are recorded in the general area 115. The MKB obtained by decrypting the MKB' is used for authenticating and revoking the player 400-2 in the same manner as described in the third embodiment. In contrast, the MKB2 is used for authenticating and revoking the controller 200.

Further, according to the fourth embodiment, the special area (i.e., the common area 114) stores therein the MKB decryption key KT and the media key conversion key KT2. The MKB decryption key KT is an MKB decryption key for the player 400-2. The media key conversion key KT2 is a media key conversion key for the controller 200. Each of these keys may be different for each memory card 2601. The relationship between the keys and the data can be explained as follows:

(1) When the MKB is processed by using the device key KD that has not been revoked, the media key KM is obtained. Further, when the MKB2 is processed by using the device key KD2 that has not been revoked, the media key KM2 is obtained.

(2) When (plain) video data is expressed as C, whereas encrypted video data is expressed as C', the video data C is dually encrypted by using the media key KM and the decryption key Kc2. This process can be expressed as follows: C'=AES-E(Kc2, AES-E(KM, C)).

(3) The MKB is obtained by decrypting the MKB' by using the MKB decryption key KT. This process can be expressed as follows: MKB=AES-D(KT, MKB').

(4) The decryption key Kc2 is obtained by converting the media key KM2 while using the media key conversion key KT2. This process can be expressed as follows: Kc2=AES-G (KT2, KM2).

(5) The process in which the encrypted video data C' is decrypted can be expressed as follows:

$$AES\text{-}D(KM,$$
$$AES\text{-}D(Kc2, C') = AES\text{-}D(KM, AES\text{-}D(Kc2, AES\text{-}E(KM, C)))) =$$
$$AES\text{-}D(KM, AES\text{-}E(KM, C)) = C$$

Figure 29:
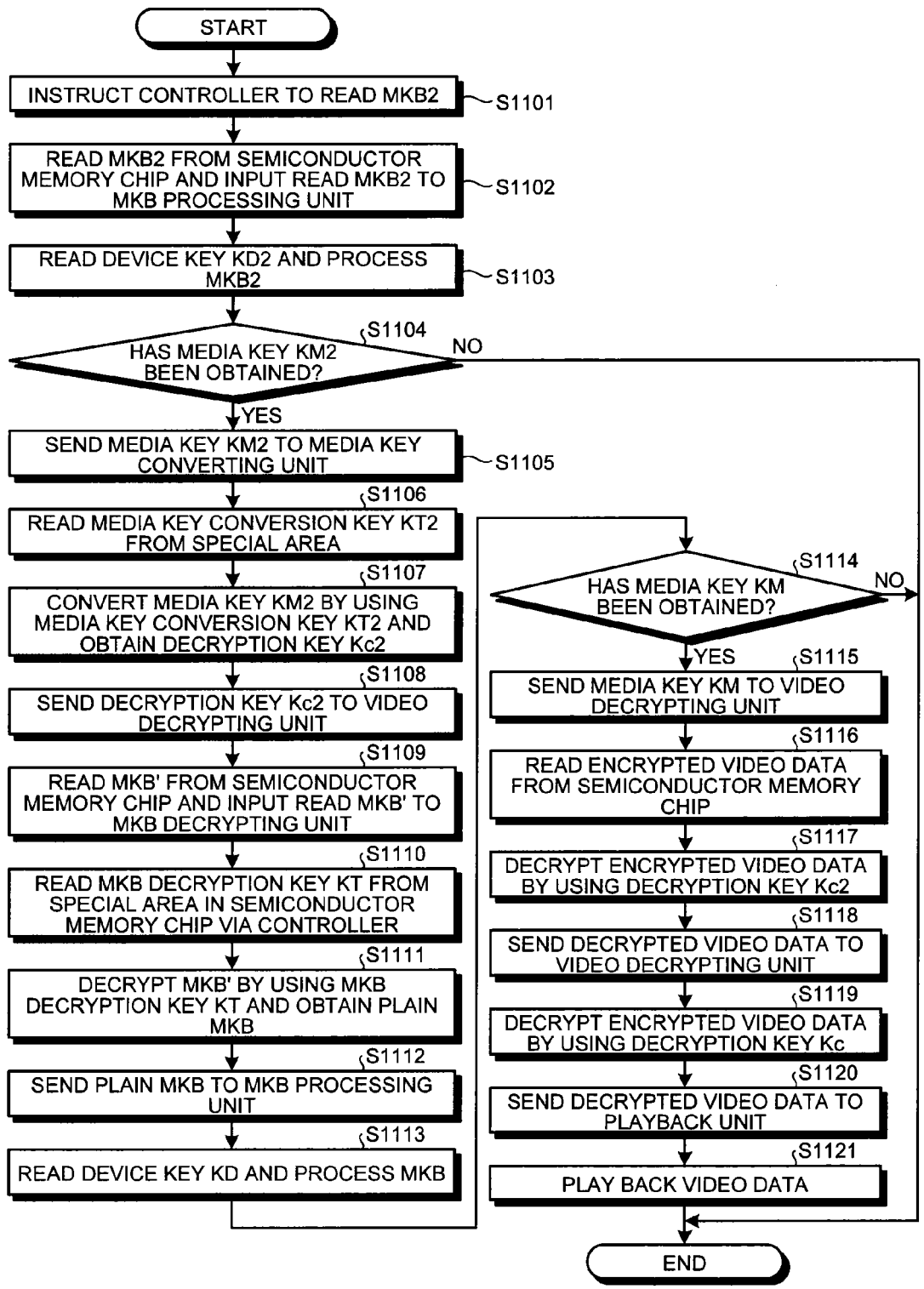
FIG. 29 is a flowchart of an entire flow in a playback process according to the fourth embodiment.

Next, a data playback process that is performed in the memory card 2601 by the player 400-2 configured as shown in FIG. 28 will be explained, with reference to FIG. 29. FIG.

29 is a flowchart of an entire flow in the playback process according to the fourth embodiment.

The player 400-2 instructs the controller 200-2 included in the memory card 2601 to read the MKB2 contained in the general area 115 (step S1101). For example, the player 400-2 provides the controller 200-2 with a designation of the head address and the size of the MKB2.

The controller 200-2 reads the page that includes the designated area from the semiconductor memory chip 100 and inputs the data (i.e., the value of the MKB2) in the designated area to the MKB processing unit 2620 (step S1102). The MKB processing unit 2620 reads the device key KD2 stored in the controller 200-2, performs the MKB processing on the input MKB2 by using the device key KD2, and derives and outputs the media key KM2 (step S1103).

After that, the MKB processing unit 2620 judges whether the media key KM2 has been obtained as a result of the MKB processing (step S1104). In the case where the device key KD has been revoked by the MKB2, the MKB processing unit 2620 is not able to derive the correct media key KM2. In that situation, the MKB processing unit 2620 judges that the media key KM2 has not been obtained (step S1104: No) and outputs an error message.

In the case where the media key KM2 has been obtained (step S1104: Yes), the MKB processing unit 2620 sends the media key KM2 to the media key converting unit 2630 (step S1105). The media key converting unit 2630 reads the media key conversion key KT2 contained in the special area (i.e., the common area 114) (step S1106). After that, the media key converting unit 2630 generates the decryption key Kc2 by converting the media key KM2 while using the read media key conversion key KT2 (step S1107). The media key converting unit 2630 sends the generated decryption key Kc2 to the video decrypting unit 2640 (step S1108). The video decrypting unit 2640 stores therein the value of the decryption key Kc that has been received.

After that, the player 400-2 reads the MKB' from the general area 115 in the semiconductor memory chip 100 via the controller 200-2 and inputs the read MKB' to the MKB decrypting unit 470 (step S1109). The MKB decrypting unit 470 reads the MKB decryption key KT from the special area (i.e., the common area 114) in the semiconductor memory chip 100 via the controller 200-2 (step S1110). After that, the MKB decrypting unit 470 decrypts the input MKB' by using the read MKB decryption key KT and obtains plain MKB (step S1111). The MKB decrypting unit 470 sends the plain MKB to the MKB processing unit 420-2 (step S1112).

The MKB processing unit 420-2 reads the device key KD stored in the player 400-2, performs the MKB processing on the input MKB by using the device key KD, and derives the media key KM (step S1113).

Subsequently, the MKB processing unit 420-2 judges whether the media key KM has been obtained as a result of the MKB processing (step S1114). In the case where the device key KD has been revoked by the MKB, the MKB processing unit 420-2 is not able to derive the correct media key KM. In that situation, the MKB processing unit 420-2 judges that the media key KM has not been obtained (step S1114: No) and outputs an error message. In the case where the media key KM has been obtained (step S1114: Yes), the MKB processing unit 420-2 sends the media key KM to the video decrypting unit 450 (step S1115).

Subsequently, the video decrypting unit 2640 included in the controller 200-2 sequentially reads the pieces of encrypted video data 2541 from the general area 115 (step S1116). The video decrypting unit 2640 decrypts the read encrypted video data by using the decryption key Kc2 stored therein (step S1117). The video decrypting unit 2640 sends the decrypted video data to the video decrypting unit 450 included in the player 400-2 (step S1118).

The video decrypting unit 450 sequentially decrypts the pieces of video data by using the decryption key Kc (step S1119) and sends the decrypted pieces of video data to the playback unit 460 (step S1120). The playback unit 460 sequentially plays back (displays) the received pieces of video data (step S1121).

When the media key conversion key KT2 is different for each memory card 2601, it means that the decryption key Kc2 is also different for each memory card 2601. Accordingly, when the media key KM or the media key conversion key KT2 is different for each memory card 2601, the encrypted video data itself is different for each memory card 2601. In other words, it is possible to individualize the encrypted video data for each memory card 2601.

As explained above, by using the memory chip according to the fourth embodiment, it is possible to combine (in the manner of the dual encrypting process) the revocation of the controller by using the MKB associated with the content (i.e., the revocation of playback devices by the content supplier) with the individualization of the encrypted video data for each memory card (i.e., the revocation of controllers by the content supplier).

In the sections above, exemplary embodiments are applied to the protection of the contents have been explained; however, it is also possible to apply an embodiment to other industrial fields. As a fifth embodiment, an embodiment is applied to a smart grid. The smart grid is a next-generation electric power grid that is structured for the purpose of stabilizing the quality of electric power, when renewable energy such as sunlight or wind power is used together with conventional electric-power generating methods such as nuclear power generation and thermal power generation.

Figure 30:
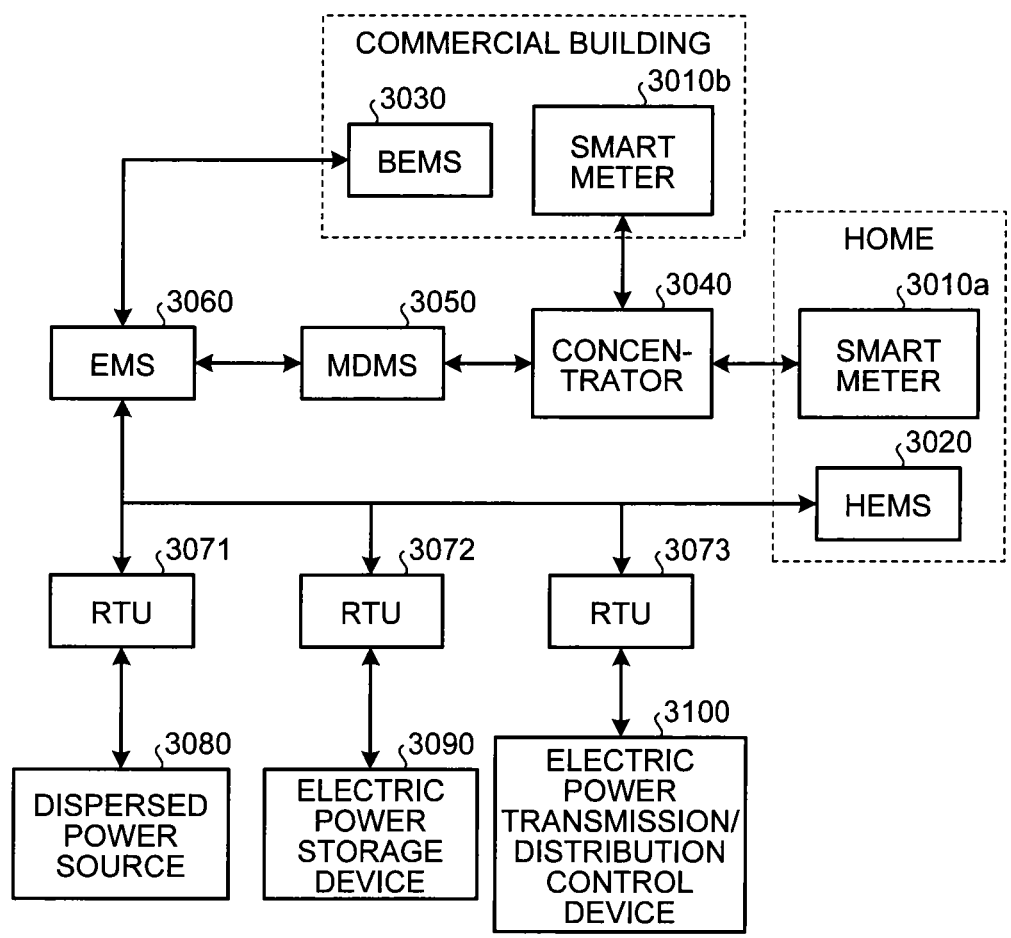
FIG. 30 is a diagram of an exemplary configuration of a next-generation electric power grid according to a fifth embodiment.

FIG. 30 is a diagram of an exemplary configuration of a next-generation electric power grid according to the fifth embodiment. In the next-generation electric power grid, a smart meter 3010a that counts an electric power usage amount and a Home Energy Management System (HEMS) 3020 that is a home server that manages electric home appliances are installed at each household. Further, as for commercial buildings, a Building Energy Management System (BEMS) 3030 that is a server that manages electric devices in the building is installed for each of the buildings. For each of the commercial buildings, a smart meter 3010b that is configured like the smart meter 3010a is installed. In the following sections, the smart meters 3010a and 3010b will be simply referred to as the "smart meters 3010".

The smart meters 3010 are organized into groups each made up of a number of smart meters by relay devices called concentrators (e.g., a concentrator 3040). The smart meters 3010 communicate with a Meter Data Management System (MDMS) 3050 via a communication network. The MDMS 3050 receives and stores therein electric power usage amounts at predetermined time intervals from the smart meters 3010 installed at the households. An Energy Management System (EMS) 3060 exercises electric-power control by, for example, requesting the smart meters 3010 installed at the households and the HEMS 3020 that the electric power consumption should be reduced, based on the electric power usage amounts of a plurality of households that have been gathered in the MDMS 3050 or information collected from sensors that are installed in electric-power systems. Further, the EMS 3060 exercises control to stabilize the voltage and the frequency of the entire grid, by controlling the following elements: a dispersed power source 3080 for solar power generation or wind power generation that is connected to a Remote Terminal Unit (RTU) 3071; an electric power storage device 3090 that is similarly connected to an RTU 3072; and an electric power transmission/distribution control device 3100 that is connected to an RTU 3073 and exercises control over the operation between the power generation side.

Figure 31:
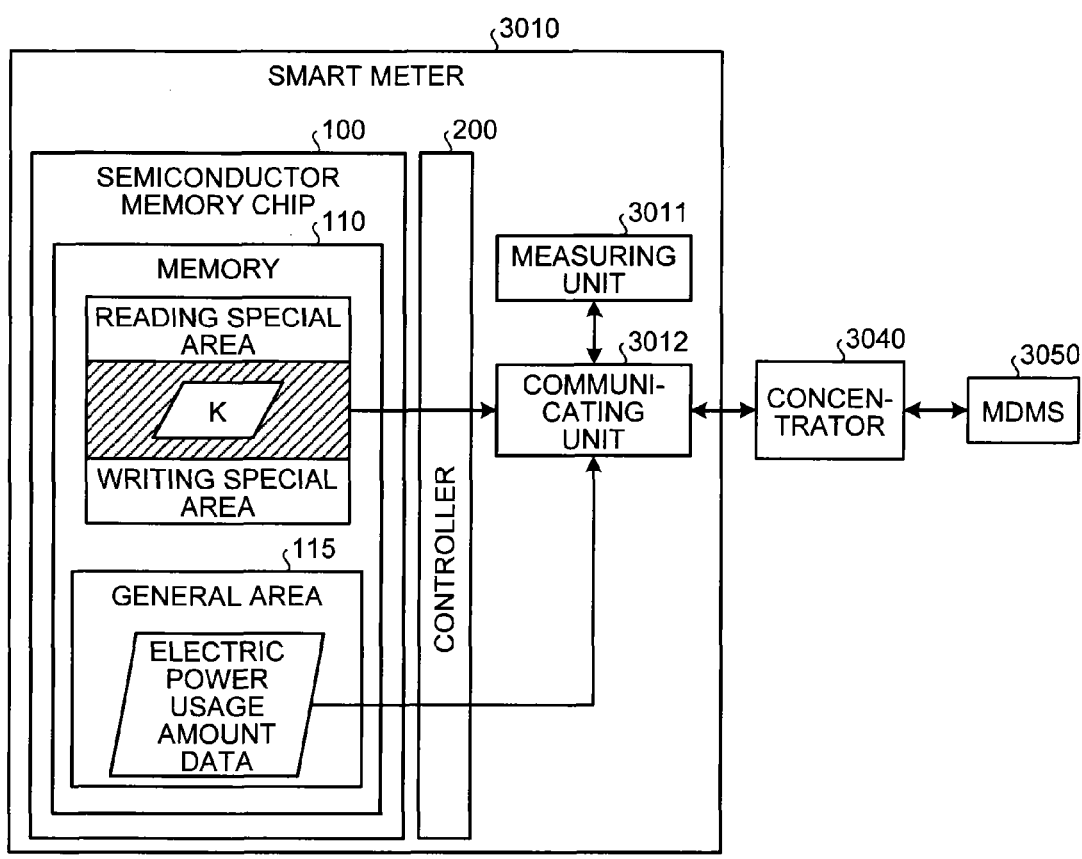
FIG. 31 is a block diagram of an exemplary configuration of a smart meter.

FIG. 31 is a block diagram of an exemplary configuration of the smart meter 3010. The smart meter 3010 performs an encrypted communication with the MDMS 3050. Although the concentrator 3040 is present on the communication path, the concentrator 3040 only relays the encrypted communication. The MDMS 3050 and the smart meter 3010 each store therein the common key K and perform the encrypted communication by using the common key K.

For example, a communicating unit 3012 connected to a measuring unit 3011 encrypts a measured value by using the common key K and sends the encrypted measured value to the MDMS 3050. The MDMS 3050 decrypts the encrypted measured value by using the common key K stored therein. With this arrangement, even if the communication is intercepted on the communication path, the person who intercepts the communication is not able to learn the measured value. As another example, there are situations in which the MDMS 3050 sends a control-purpose command to the measuring unit 3011. The command is, for example, a control command that is used for instructing that a measuring process should be canceled or started or that measured data should be sent. The MDMS 3050 encrypts the control command by using the common key K and transmits the encrypted control command to the communicating unit 3012 included in the smart meter 3010. The communicating unit 3012 decrypts the encrypted control command by using the common key K and sends the control command to the measuring unit 3011. As yet another example, electric power usage amount data is stored in the general area in the memory 110 included in the semiconductor memory chip 100, so that the communicating unit 3012 encrypts the electric power usage amount data by using the common key K and transmits the encrypted electric power usage amount data to the MDMS 3050. The MDMS 3050 decrypts the encrypted electric power usage amount data by using the common key K.

In the smart meter 3010, the common key K is stored in the special area in the memory included in the semiconductor memory chip. It is desirable if the common key K is updated regularly or occasionally. An update-purpose common key will be referred to as K'. The MDMS 3050 writes the update-purpose common key K' into the writing special area in the memory 110 included in the semiconductor memory chip 100. To realize this configuration, the semiconductor memory chip 100 needs to be authenticated by the MDMS 3050, as explained above. In addition, in order for the communicating unit 3012 included in the smart meter 3010 to be able to read the (updated) common key K' via the controller 200, the controller 200 needs to be authenticated by the semiconductor memory chip 100. Through the common key updating process and the utilization of the updated common key, the entirety of the smart meter 3010 that uses the semiconductor memory chip 100 is, as a result, authenticated by the MDMS 3050.

Serving as, for example, the writing device 300 shown in FIG. 14, the MDMS 3050 writes the update-purpose common key K' into the writing special area in the semiconductor memory chip 100. Further, the controller 200 included in the smart meter 3010 includes, for example, the encryption key sharing unit 210-2 shown in FIG. 7 and the reading control unit 220-2 shown in FIG. 9.

As explained above, according to the fifth embodiment, it is possible to prevent illegitimate use of data such as the data used in the next-generation electric power grid, which is in a different field from that of the protection of the contents.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A memory chip connected to a controller that controls reading and writing of data in response to a request, the memory chip comprising:
   a memory including a first area that is a predetermined data storage area;
   a key storage that stores therein a second key that corresponds to a first key externally used to convert the data;
   a converter that receives, from the controller, data to be written into the first area and generates converted data by converting the data to be written using the second key; and
   a writer that writes the converted data into the first area.

2. The memory chip according to claim 1, further comprising:
   an encrypter that generates encrypted data by encrypting the converted data, which has been written into the first area, using an encryption key shared with the controller; and
   a sender that sends the encrypted data to the controller.

3. The memory chip according to claim 1, further comprising:
   a code storage that stores therein an error correction code of the data to be written, wherein
   the converter receives, from the controller, a converted code obtained by converting the error correction code of the data to be written using the first key and the data to be written that has been converted using the first key, converts the converted code into the error correction code using the second key, and generates the converted data by decrypting using the second key the data to be written that has been converted using the first key, and
   the writer further stores the error correction code resulting from the decryption into the code storage.

4. The memory chip according to claim 1, further comprising:
   a code storage that stores therein an error correction code of the data to be written, wherein
   the converter receives, from the controller, the error correction code of the data to be written and the data to be written, and converts the data to be written into the converted data using the second key, and
   the writer further stores the received error correction code into the code storage.

5. A memory chip connected to a controller that controls reading and writing of data in response to a request, the memory chip comprising:
   a memory including a first area that is a predetermined data storage area;
   a key storage that stores therein a second key that corresponds to a first key externally used to convert the data;

a writer that receives, from the controller, data to be written into the first area and writes the received data to be written into the first area; and a converter that generates converted data by converting the data to be written, which has been written into the first area, using the second key.

6. The memory chip according to claim 5, further comprising:

an encrypter that generates encrypted data by encrypting the converted data using an encryption key shared with the controller; and a sender that sends the encrypted data to the controller.

7. The memory chip according to claim 5, further comprising:

a code storage that stores therein an error correction code of the data to be written, wherein the writer receives, from the controller, a converted code obtained by converting the error correction code of the data to be written using the first key and the data to be written, writes the received converted code into the code storage, and writes the received data to be written into the first area, and the converter decrypts using the second key the converted code, which has been written into the first area, into the error correction code and decrypts using the second key the data to be written, which has been written into the first area, into the data to be written.

8. The memory chip according to claim 5, further comprising:

a code storage that stores therein an error correction code of the data to be written, wherein the writer receives, from the controller, the error correction code of the data to be written and the data to be written, writes the received error correction code into the code storage, and writes the received data to be written into the first area.

9. A memory chip connected to a controller that controls reading and writing of data in response to a request, the memory chip comprising:

a memory including a first area that is a predetermined data storage area;

a key storage that stores therein a second key that corresponds to a first key externally used to convert the data; and the memory chip configured, to receive, from the controller, data to be written into the first area, to generate converted data by converting the data to be written using the second key, and to write the converted data into the first area.

10. The memory chip according to claim 9, wherein the memory chip is further configured, to generate encrypted data by encrypting the converted data, which has been written into the first area, using an encryption key shared with the controller; and to send the encrypted data to the controller.

11. The memory chip according to claim 9, further comprising:

a code storage that stores therein an error correction code of the data to be written; and the memory chip configured, to receive, from the controller, a converted code obtained by converting the error correction code of the data to be written using the first key and the data to be written that has been converted using the first key, to convert the converted code into the error correction code using the second key, to generate the converted data by decrypting using the second key the data to be written that has been converted using the first key, and to store the error correction code resulting from the decryption into the code storage.

12. The memory chip according to claim 9, further comprising:

a code storage that stores therein an error correction code of the data to be written; and the memory chip configured, to receive, from the controller, the error correction code of the data to be written and the data to be written, to convert the data to be written into the converted data using the second key, and to store the received error correction code into the code storage.

13. A memory chip connected to a controller that controls reading and writing of data in response to a request, the memory chip comprising:

a memory including a first area that is a predetermined data storage area;

a key storage that stores therein a second key that corresponds to a first key externally used to convert the data; and the memory chip configured, to receive from the controller, data to be written into the first area, to write the received data to be written into the first area, and to generate converted data by converting the data to be written, which has been written into the first area, using the second key.

14. The memory chip according to claim 13, wherein the memory chip is further configured, to generate encrypted data by encrypting the converted data using an encryption key shared with the controller, and to send the encrypted data to the controller.

15. The memory chip according to claim 13, further comprising:

a code storage that stores therein an error correction code of the data to be written; and the memory chip configured, to receive, from the controller, a converted code obtained by converting the error correction code of the data to be written using the first key and the data to be written, to write the received converted code into the code storage, to write the received data to be written into the first area, to decrypt using the second key the converted code, which has been written into the first area, into the error correction code, and to decrypt using the second key the data to be written, which has been written into the first area, into the data to be written.

16. The memory chip according to claim 13, further comprising:

a code storage that stores therein an error correction code of the data to be written; and the memory chip configured, to receive, from the controller, the error correction code of the data to be written and the data to be written, to write the received error correction code into the code storage, and to write the received data to be written into the first area.

* * * * *